United States Patent
Yamamichi

(10) Patent No.: US 10,803,308 B2
(45) Date of Patent: Oct. 13, 2020

(54) APPARATUS FOR DECIDING WHETHER TO INCLUDE TEXT IN SEARCHABLE DATA, AND METHOD AND STORAGE MEDIUM THEREOF

(71) Applicant: CANON KABUSHIKI KAISHA, Tokyo (JP)

(72) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 15/685,322

(22) Filed: Aug. 24, 2017

(65) Prior Publication Data

US 2018/0061074 A1    Mar. 1, 2018

(30) Foreign Application Priority Data

Aug. 31, 2016  (JP) .................................. 2016-169353

(51) Int. Cl.
*G06K 9/00* (2006.01)
*G06T 11/60* (2006.01)

(52) U.S. Cl.
CPC ..... *G06K 9/00442* (2013.01); *G06K 9/00456* (2013.01); *G06K 9/00463* (2013.01); *G06T 11/60* (2013.01)

(58) Field of Classification Search
CPC ........... G06K 9/00442; G06K 9/00456; G06K 9/00463; G06T 11/60
See application file for complete search history.

(56) References Cited

U.S. PATENT DOCUMENTS

| | | | |
|---|---|---|---|
| 5,907,835 A | 5/1999 | Yokomizo et al. | |
| 6,442,606 B1 * | 8/2002 | Subbaroyan | G06F 17/218 709/224 |
| 7,428,701 B1 * | 9/2008 | Gavin | G06F 17/241 715/243 |
| 7,643,682 B2 * | 1/2010 | Bronstein | G06F 17/2264 382/180 |
| 7,876,335 B1 * | 1/2011 | Pittenger | G06F 17/21 345/629 |
| 8,411,956 B2 * | 4/2013 | McGatha | G06F 40/103 382/182 |
| 8,456,654 B2 * | 6/2013 | Kelly | G06T 11/60 358/1.13 |
| 9,141,594 B2 * | 9/2015 | Pittenger | G06F 17/21 |
| 9,535,913 B2 * | 1/2017 | Tecu | G06F 16/116 |
| 9,965,456 B2 * | 5/2018 | Pittenger | G06F 17/24 |
| 10,049,310 B2 * | 8/2018 | Abou Mahmoud | G06K 9/6878 |
| 10,108,815 B2 * | 10/2018 | Korneev | G06F 17/211 |

(Continued)

FOREIGN PATENT DOCUMENTS

| | | | | |
|---|---|---|---|---|
| JP | H08-212331 | | 8/1996 | |
| JP | 2019067235 A | * | 4/2019 | ............ H04N 1/448 |

*Primary Examiner* — Kavita Padmanabhan
*Assistant Examiner* — Tyler Schallhorn
(74) *Attorney, Agent, or Firm* — Venable LLP

(57) ABSTRACT

The present invention comprises: creating imaged document data, whose entire page is made up of one image object, based on document data including text objects within a page; determining whether each of the text objects is a text object that is displayed in a state where a user can visually recognize it; and embedding, based on results of the determination, data of a character string corresponding to the text object, that is displayed in a state where a user can visually recognize it, in the imaged document data.

11 Claims, 19 Drawing Sheets

(56) References Cited

U.S. PATENT DOCUMENTS

| | | | |
|---|---|---|---|
| 2002/0124029 A1* | 9/2002 | Gwinn | G06F 17/214 715/269 |
| 2004/0205601 A1* | 10/2004 | Smith | G06F 17/2264 715/250 |
| 2005/0063615 A1* | 3/2005 | Siegel | G06F 16/9535 382/309 |
| 2006/0282769 A1* | 12/2006 | Bronstein | G06F 17/2264 715/236 |
| 2007/0174766 A1* | 7/2007 | Rubin | G06F 17/218 715/234 |
| 2008/0204788 A1* | 8/2008 | Kelly | G06T 11/60 358/1.15 |
| 2009/0164881 A1* | 6/2009 | Segarra | G06F 21/6245 715/230 |
| 2010/0080493 A1* | 4/2010 | McGatha | G06K 9/00442 382/321 |
| 2014/0304594 A1* | 10/2014 | Pittenger | G06F 17/21 715/243 |
| 2015/0363375 A1* | 12/2015 | Pittenger | G06F 17/21 715/243 |
| 2015/0378973 A1* | 12/2015 | Korneev | G06F 21/6245 715/256 |
| 2017/0075905 A1* | 3/2017 | Tecu | G06F 16/116 |
| 2018/0060705 A1* | 3/2018 | Abou Mahmoud | G06K 9/00456 |
| 2019/0102645 A1* | 4/2019 | Nakatsuka | H04N 1/38 |

* cited by examiner

| Manuscript object ID:1001 |
| Object kind:rectangle |
| Top-left coordinate:(20,34) |
| Bottom-right coordinate:(81,65) |
| Overlap order:0 |
| Manuscript object unique information |

| Manuscript object ID:1002 |
| Object kind:text |
| Top-left coordinate:(30,40) |
| Bottom-right coordinate:(50,50) |
| Overlap order:1 |
| Manuscript object unique information |

Search setting in imaging

☑ Enable search by character string 1601
that is displayed at the time of imaging ☑ Embed manuscript 1602

☑ Embed annotation 1603

FIG.16

APPARATUS FOR DECIDING WHETHER TO INCLUDE TEXT IN SEARCHABLE DATA, AND METHOD AND STORAGE MEDIUM THEREOF

BACKGROUND OF THE INVENTION

Field of the Invention

The present invention relates to a technique that enables a search in accordance with display contents of a document image in imaging processing for document data.

Description of the Related Art

It is possible for document data that is handled by a document editing application, such as Word of Microsoft Corporation, to include various kinds of data as drawing objects, e.g., image data of such as a bitmap image, text data of such as a character string, graphics data of such as a rectangle, and so on. It is possible for a user to add an image, a character, and a graphics to each page of a document by using the document editing application.

Further, a technique is known that converts a format of the above-described document data, which is unique to the document editing application, into a format that can also be made use of by another application. As the technique such as this, a technique is known that creates only image data of drawing objects included in the document data (imaging processing for document data). By converting document data by using the technique such as this, it is made possible to easily share the document data and it is no longer possible to easily edit a character or a graphics.

On the other hand, a technique is known that enables a search of document data by using text information by saving the text information for each of a plurality of pieces of document data in a document management system.

Japanese Patent Laid-Open No. H08-212331 (1996) has disclosed a technique to save a document image created based on document data in a database. Specifically, text information is created based on a drawing code of document data and at the same time, a document image is created based on the drawing code and the text information and the document image are associated with each other and saved in a database. Japanese Patent Laid-Open No. H08-212331 (1996) makes it possible to search for text information and to present a document image associated with text information including a predetermined character string to a user. However, Japanese Patent Laid-Open No. H08-212331 (1996) has the following problem.

SUMMARY OF THE INVENTION

At the time of creating document data by using a document editing application, in the case where another object, such as a graphics object, is arranged on a text object, the text object enters a hidden state. In a document image created by imaging processing for document data such as this, the character string of this text object is not displayed, and therefore, it is not possible for a user to visually recognize the character string. On the other hand, in the case where text information (search information) is created based on the drawing code of the document data, i.e., the character code is extracted, the character code relating to the character string of the text object hidden by another object is also extracted. Consequently, there is such a problem that the character string that is not displayed in the document image is also included in the targets that can be searched for. In particular, in the case where the character string of the text object hidden by another object indicates information that should not be shared, this may lead to a problem of security.

Consequently, an object of the present invention is to exclude a character string that is not displayed in a state where a user can visually recognize it from the targets that can be searched for at the time of creating imaged document data by performing imaging processing for document data.

The present invention is an apparatus including: a creation unit configured to create imaged document data, whose entire page is made up of one image object, based on document data including text objects within a page; a determination unit configured to determine whether each of the text objects is a text object that is displayed in a state where a user can visually recognize it; and an embedment unit configured to embed data of a character string corresponding to the text object, that is displayed in a state where a user can visually recognize it, in the imaged document data based on results of the determination.

Further features of the present invention will become apparent from the following description of exemplary embodiments with reference to the attached drawings.

BRIEF DESCRIPTION OF THE DRAWINGS

FIG. 16 is a diagram showing a dialog of a GUI in a second embodiment;

DESCRIPTION OF THE EMBODIMENTS

In the following, with reference to the drawings, preferred embodiments of the present invention are explained as examples. However, the relative arrangement of components, GUI screens, flows, and so on described below are merely exemplary and are not intended to limit the scope of the present invention only to those. It should be understood that those obtained by appropriately modifying or improving the embodiments to be described in the following based on the ordinary knowledge of a person in the art within the scope not deviating from its gist fall within the scope of the present invention.

First Embodiment

<About Hardware Configuration of PC>

Figure 1:
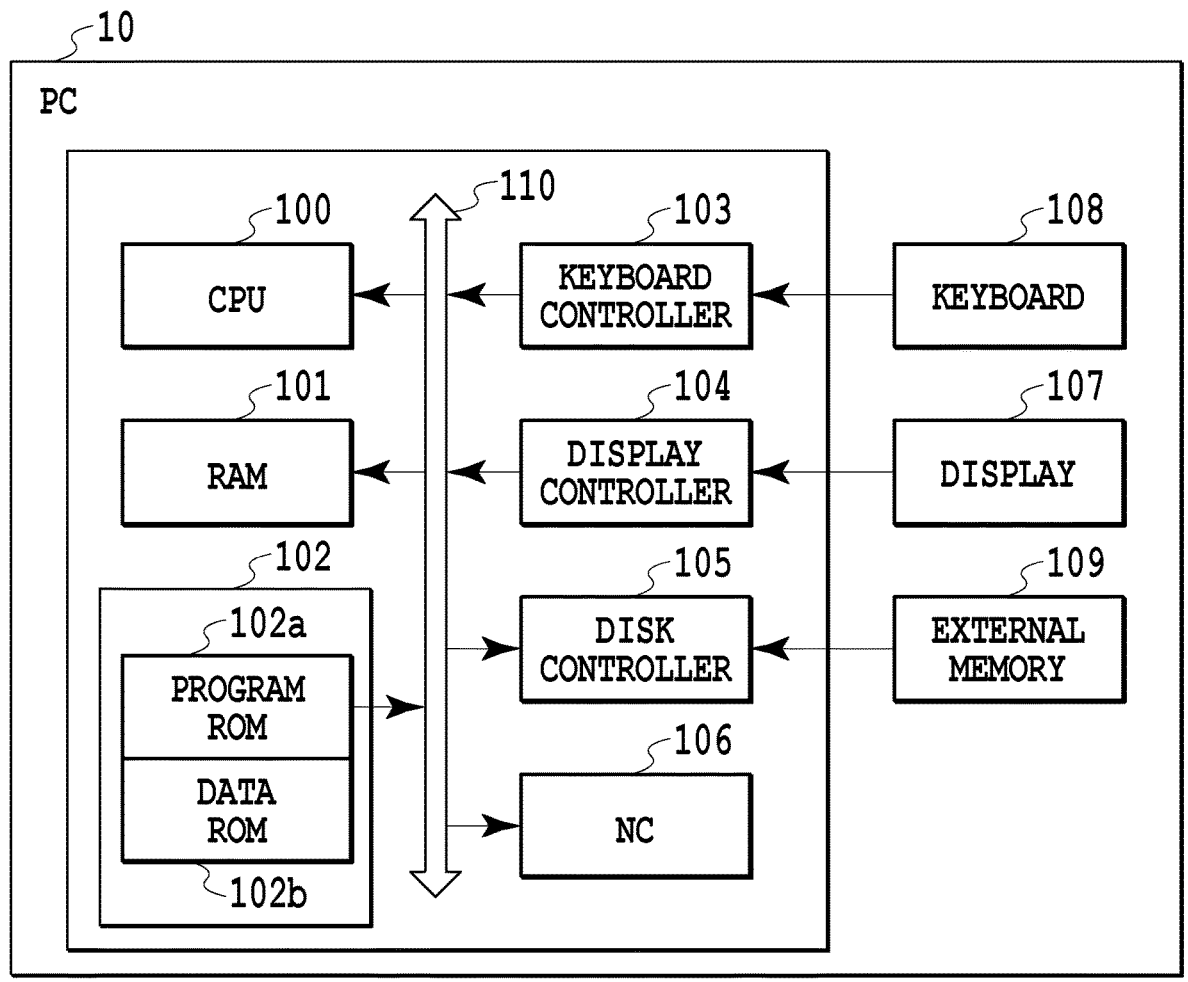
FIG. 1 is a block diagram showing a hardware configuration of a PC in a first embodiment.

FIG. 1 is a block diagram showing a hardware configuration of an information processing apparatus (hereinafter, PC) 10 in the present embodiment. In the present embodiment, the PC 10 implements a device to edit a document (hereinafter, document editing device) and a device to manage a document (hereinafter, document management device).

A CPU 100 centralizedly controls each device connected to a system bus 110 in accordance with programs stored in a RAM 101. The RAM 101 is a storage medium that temporarily stores data and also functions as a main memory, a work memory, and so on of the CPU 100. A ROM 102 stores various programs and data and separately includes a program ROM 102a that stores a boot program, BIOS, and so on, and a data ROM 102b that stores various kinds of data. In the present embodiment, the area of the ROM 102 is used by internally dividing the area, but it may also be possible to make up the program ROM 102a and the data ROM 102b as physically separate storage units. A keyboard controller 103 controls an input by a user via a keyboard 108, a pointing device (e.g., mouse), not shown schematically, and so on. A display controller 104 controls a display onto a display 107. A disk controller 105 controls data access in an external memory 109 (e.g., hard disk, floppy disk, and so on) that stores various kinds of data, data write to the external memory 109, and data read from the external memory 109. A network controller (hereinafter, NC) 106 is connected to a network, such as a LAN, and controls data communication between the PC 10 and another device connected via the network.

<About Software Configuration of PC (Document Editing Device)>

Figure 2A:
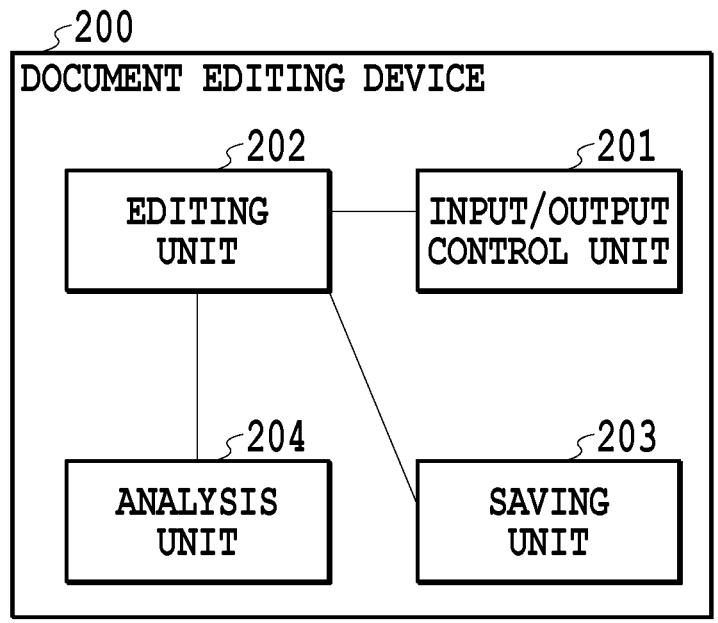
FIG. 2A and FIG. 2B are each a block diagram showing a software configuration of the PC in the first embodiment.
Figure 2B:
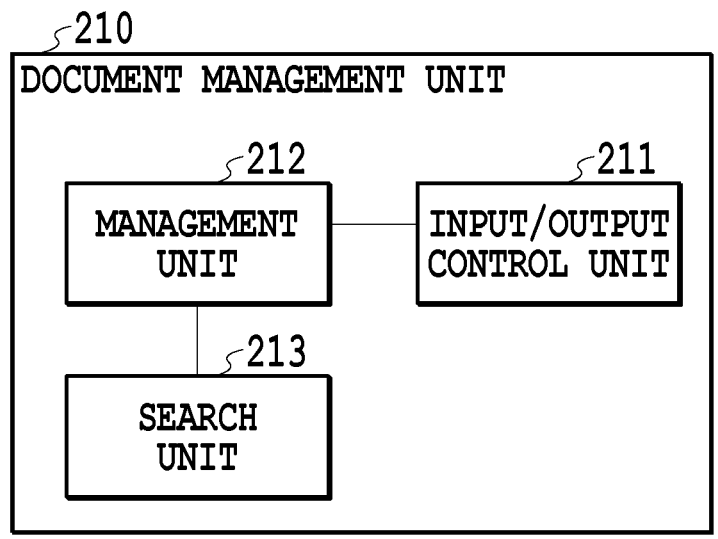

FIG. 2A and FIG. 2B are each a block diagram showing a software configuration of the PC 10 in the present embodiment. Each component shown in FIG. 2A and FIG. 2B is implemented by programs stored in the program ROM 102a and the external memory 109 being loaded onto the RAM 101 and by the CPU 100 executing the loaded programs.

The PC 10 functions as a document editing device that provides a user with a function to read document data and to edit a document. FIG. 2A show a software configuration in the case where the PC 10 functions as a document editing device 200. As the document data that the document editing device 200 handles, it may also be possible to use document data in an arbitrary format as long as the format can hold image data and text data. The document data in an arbitrary format includes document data in a format unique to the document editing device 200, document data obtained by converting document data used in a common application into that which the document editing device 200 can handle, and so on. As shown in FIG. 2A, the document editing device 200 includes an input/output control unit 201, an editing unit 202, a saving unit 203, and an analysis unit 204. The input/output control unit 201 controls an input from a user and an output to a user via a GUI screen displayed on the display 107. The GUI screen of the document editing device 200 will be described later by using FIG. 3A. The editing unit 202 performs various kinds of editing processing for document data in accordance with editing instructions input from the input/output control unit 201. The saving unit 203 saves document data in accordance with saving instructions input from the editing unit 202. The saving instructions may be those based on a user input via the GUI screen of the document editing device 200 or may be those by automatic saving that is performed at the time of a user editing a document. The document data saved here includes document data while being updated by the document editing device 200, document data for which updating has been completed, and so on. The analysis unit 204 analyzes document data and at the same time, generates one or a plurality of drawing objects based on the analyzed document data.

Figure 3A:
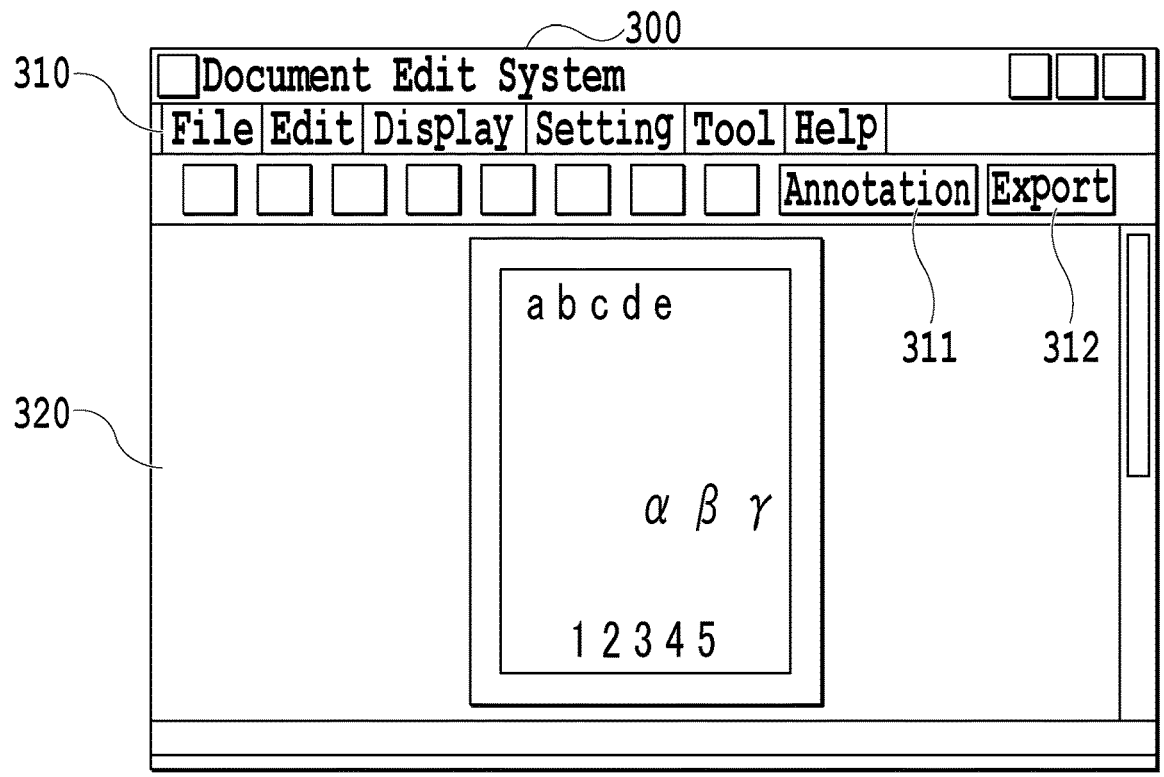
FIG. 3A and FIG. 3B are each a diagram showing a GUI screen of a document editing device in the first embodiment.

FIG. 3A shows the GUI screen of the document editing device 200. The GUI screen of the document editing device 200 has a main window 300, a menu/tool bar 310, and a preview pane 320. In the menu/tool bar 310, menu items and buttons for a user to select a function that the document editing device 200 can provide are arranged. As shown schematically, the buttons include an Annotation button 311 to attach annotation to document data, an Export button 312 to convert document data into a different format and save the document data, and so on. On the preview pane 320, the drawing contents of each page of the document data being edited are displayed. The drawing contents that are displayed are determined based on the document data making up the manuscript data and the annotation data. The manuscript data and the annotation data will be described later by using FIG. 6 and FIG. 7.

Figure 3B:
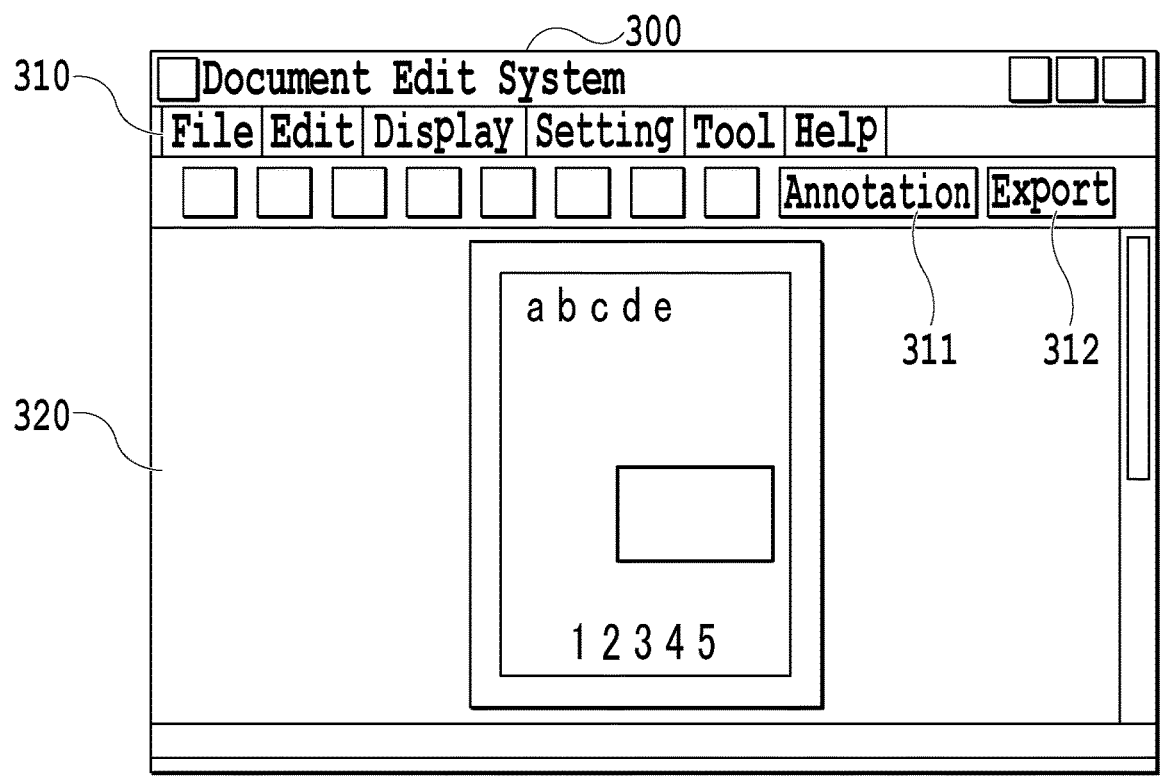

FIG. 3A shows that character strings corresponding to three text objects, i.e., a character string abcde, a character string αβγ, and a character string 12345 are displayed. On the other hand, FIG. 3B shows that the character string αβγ is not displayed because a rectangular graphics object is placed on the text object corresponding to the character string αβγ.

<About Software Configuration of PC (Document Management Device)>

The PC 10 also functions as a document management device that manages one or a plurality of pieces of document data and presents information (name and the like) relating to the document data that is managed to a user. FIG. 2B shows a software configuration in the case where the PC 10 functions as a document management device 210. It is possible for a user to make use of the management function to manage document data (to duplicate, delete document data itself, and so on) via the document management device 210 and the search function to search for document data. As shown in FIG. 2B, the document management device 210 includes an input/output control unit 211, a management unit 212, and a search unit 213. The input/output control unit 211 controls an input from a user and an output to a user (display of document data in a list and the like) via a GUI screen displayed on the display 107. The GUI screen of the document management device 210 will be described later by using FIG. 4. The management unit 212 performs various kinds of processing, such as management processing of document data, i.e., duplication and deletion of document data, in accordance with management instructions input from the input/output control unit 211. The search unit 213 searches for document data in accordance with search instructions input from the management unit 212. The search instructions are based on a user input via the GUI screen of the document management device 210. The results of the search are displayed on the GUI screen by the input/output control unit 211.

Figure 4:
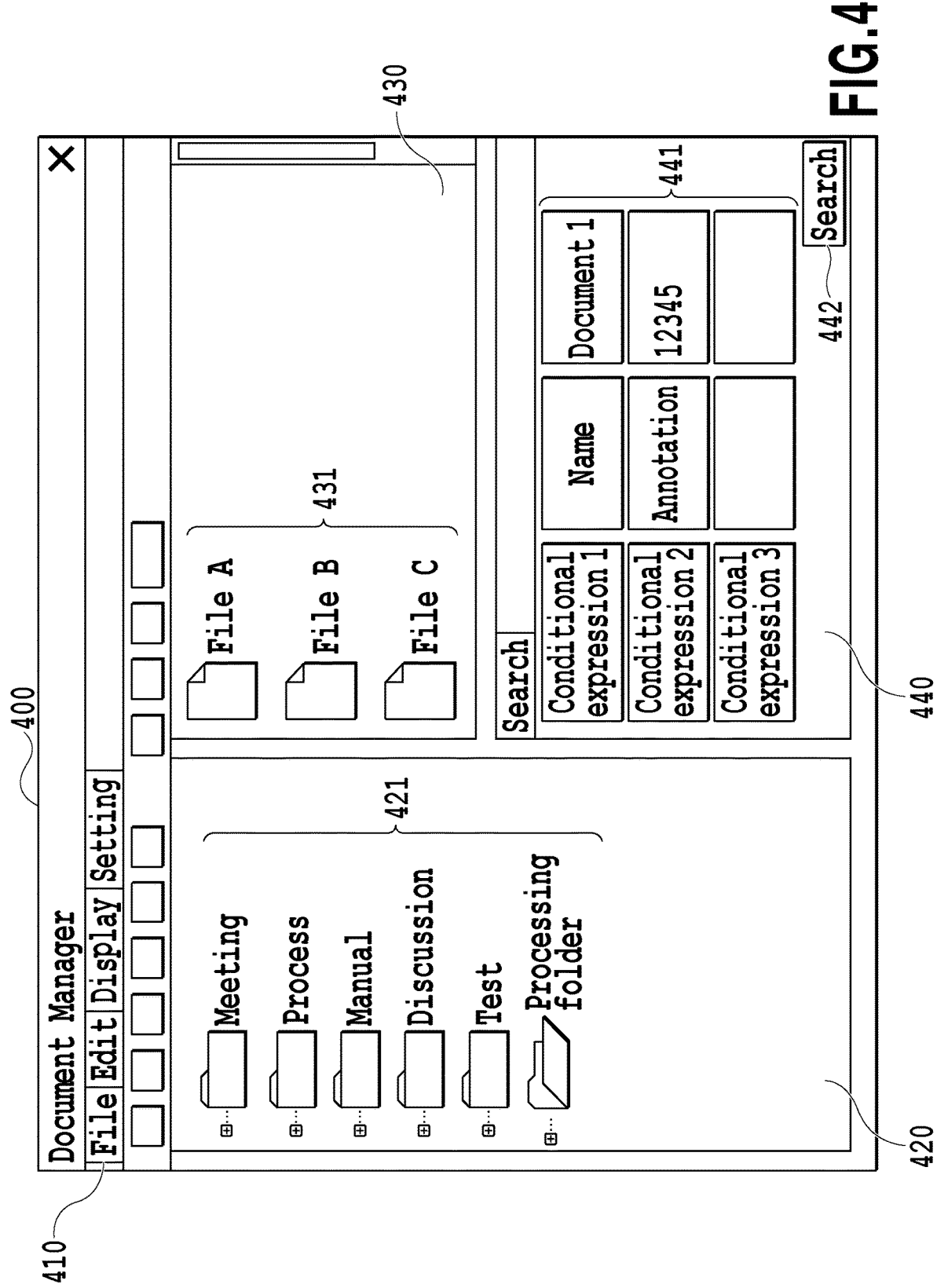
FIG. 4 is a diagram showing a GUI screen of a document management device in the first embodiment.

FIG. 4 shows the GUI screen of the document management device 210. The GUI screen of the document management device 210 has a main window 400, a menu/tool bar 410, a folder display pane 420, a document data display pane 430, and a search pane 440. On the menu/tool bar 410, menu items and buttons for a user to select a function that the document management device 210 can provide are arranged. On the folder display pane 420, folders 421 that the document management device 210 manages are displayed.

On the document data display pane 430, document data 431 is displayed by a thumbnail and file names. For example, in the case where a search via the search pane 440 is not performed, on the document data display pane 430, all the document data existing in the folders selected on the folder display pane 420 is displayed. Alternatively, in the case where a search via the search pane 440 is performed, on the document data display pane 430, the document data that exists in the folders selected on the folder display pane 420 and satisfies search conditions is displayed.

On the search pane 440, search boxes 441 and a Search execution button 442 are arranged, which provide a user with a function to search for document data that satisfies search conditions from the document data existing in the folders that the document management device 210 manages. In the search boxes 441, it is possible to specify search conditions, and for example, it is possible to specify a file name of document data, a character string of annotation included in document data, and so on. In the case where the Search execution button 442 is pressed down by a user, a search for document data based on the search conditions input to the search boxes 441 is performed and the search results are displayed on the document data display pane 430.

<About Data Structure of Document Data>

Figure 5:
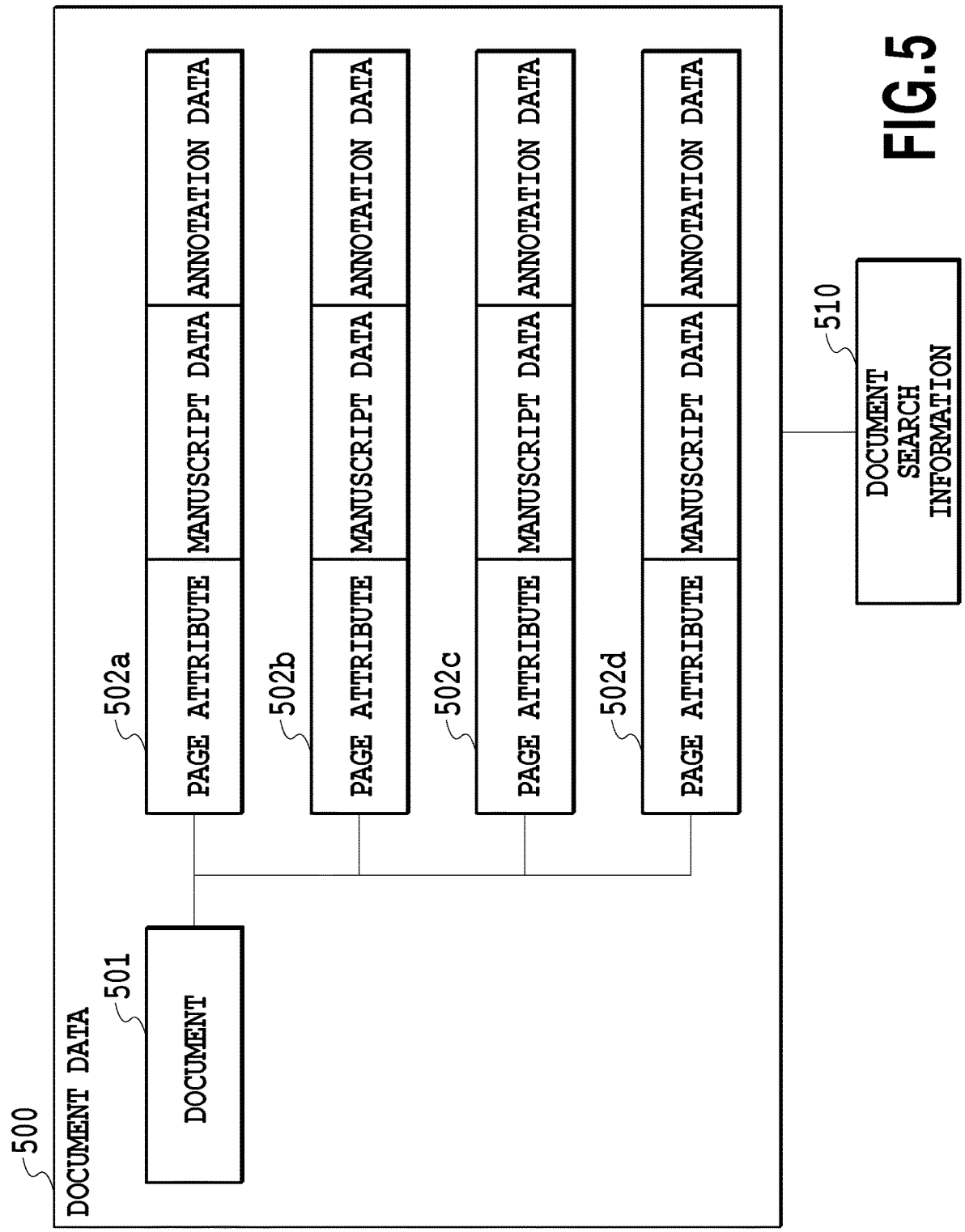
FIG. 5 is a diagram showing a data structure of document data.

A data structure of document data that is handled in the present embodiment is explained by using FIG. 5. FIG. 5 is a diagram schematically showing an example of a data structure of document data. As shown schematically, document data 500 has a tree structure including a plurality of nodes, similar to a paper medium book, and includes one document 501, which is a higher layer, and pages 502*a*, 502*b*, 502*c*, and 502*d*, which are lower layers. As described above, document data can include a plurality of pages, but there may be a configuration in which document data includes only one page. For the document 501, the attribute (document attribute) relating to the entire document is defined and has a defined attribute value and links with the pages 502*a*, 502*b*, 502*c*, and 502*d*. Each of the pages 502*a*, 502*b*, 502*c*, and 502*d* corresponds to each page defined by the document editing device 200 and the attribute (page attribute) is defined for each page and each page has an entity (i.e., manuscript data and annotation data) corresponding to each page. The terms "document" and "page" used here are terms that are used as a matter of convenience for explaining the data structure (tree structure including a plurality of nodes) of document data and other terms may also be used as long as the terms have an equivalent configuration. As data that the document management device 210 uses for a search, there exists document search information 510 associated with the document data 500. The document search information 510 will be described later by using FIG. 9.

<About Data Structure of Manuscript Object>

Figure 6:
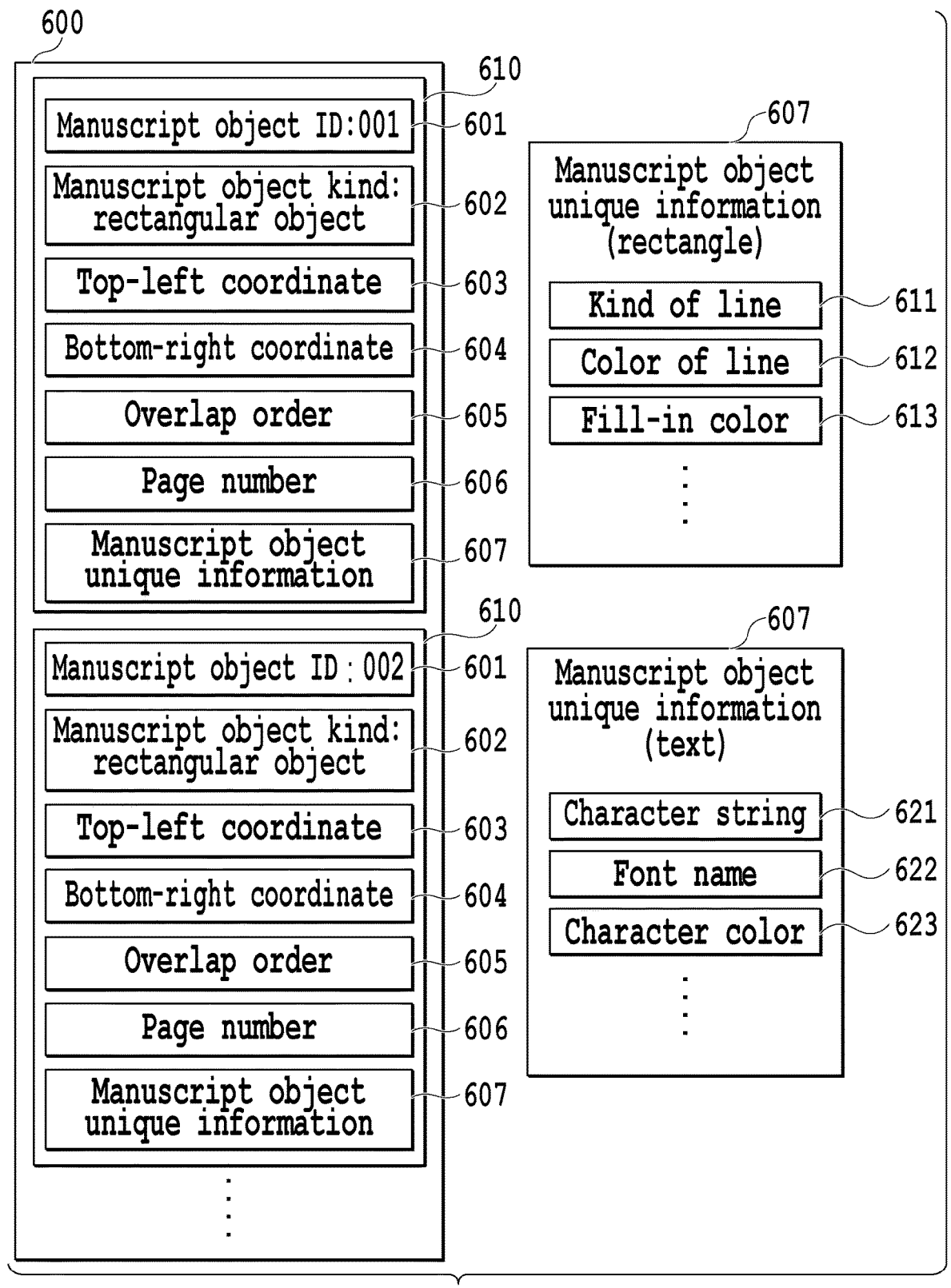
FIG. 6 is a diagram showing a data structure of a manuscript object.

FIG. 6 is a diagram for explaining a data structure of a manuscript object that is used as manuscript data of each page of document data and shows a list (hereinafter, manuscript object list) 600 to manage information relating to a manuscript object arranged on each page. As shown schematically, each manuscript object has information on items indicated by symbols 601 to 607.

Manuscript object ID 601 is an identifier (hereinafter, ID) to identify a manuscript object. Manuscript object kind 602 is information indicating the kind of the manuscript object. Top-left coordinate 603 is information (value) on the top-left coordinates of the rectangle of the manuscript object. Bottom-right coordinate 604 is information (value) on the bottom-right coordinates of the rectangle of the manuscript object. Overlap order 605 is information indicating the order of drawing in the case where the manuscript objects overlap each other (i.e., indicating whether a manuscript object is drawn on or under another manuscript object that overlaps the manuscript object). Page number 606 is a page number of a page on which the manuscript object is arranged.

Manuscript object unique information 607 is unique information for each manuscript object. For example, in the case where the manuscript object is a rectangular object, in Manuscript object unique information 607, information on items indicated by symbols 611 to 613 is included as shown schematically. Kind of line 611 is information indicating the kind of the line of the rectangle. Color of line 612 is information (hereinafter, color information) indicating the color of the line of the rectangle. Specifically, the color information is pixel values of the RGB channels specifying a color and the alpha channel specifying transparency. Fill-in color 613 is information on a color with which the inside of the rectangle is filled in. Further, for example, in the case where the manuscript object is a text object, in Manuscript object unique information 607, information on items indicated by symbols 621 to 623 is included as shown schematically. Character string 621 is a character string of the text object. Font name 622 is information indicating a specified font. Character color 623 is color information on a character.

As described above, a data group (hereinafter, manuscript object information) 610 corresponding to each manuscript object is held in the manuscript object list 600.

<About Data Structure of Annotation Object>

Figure 7:
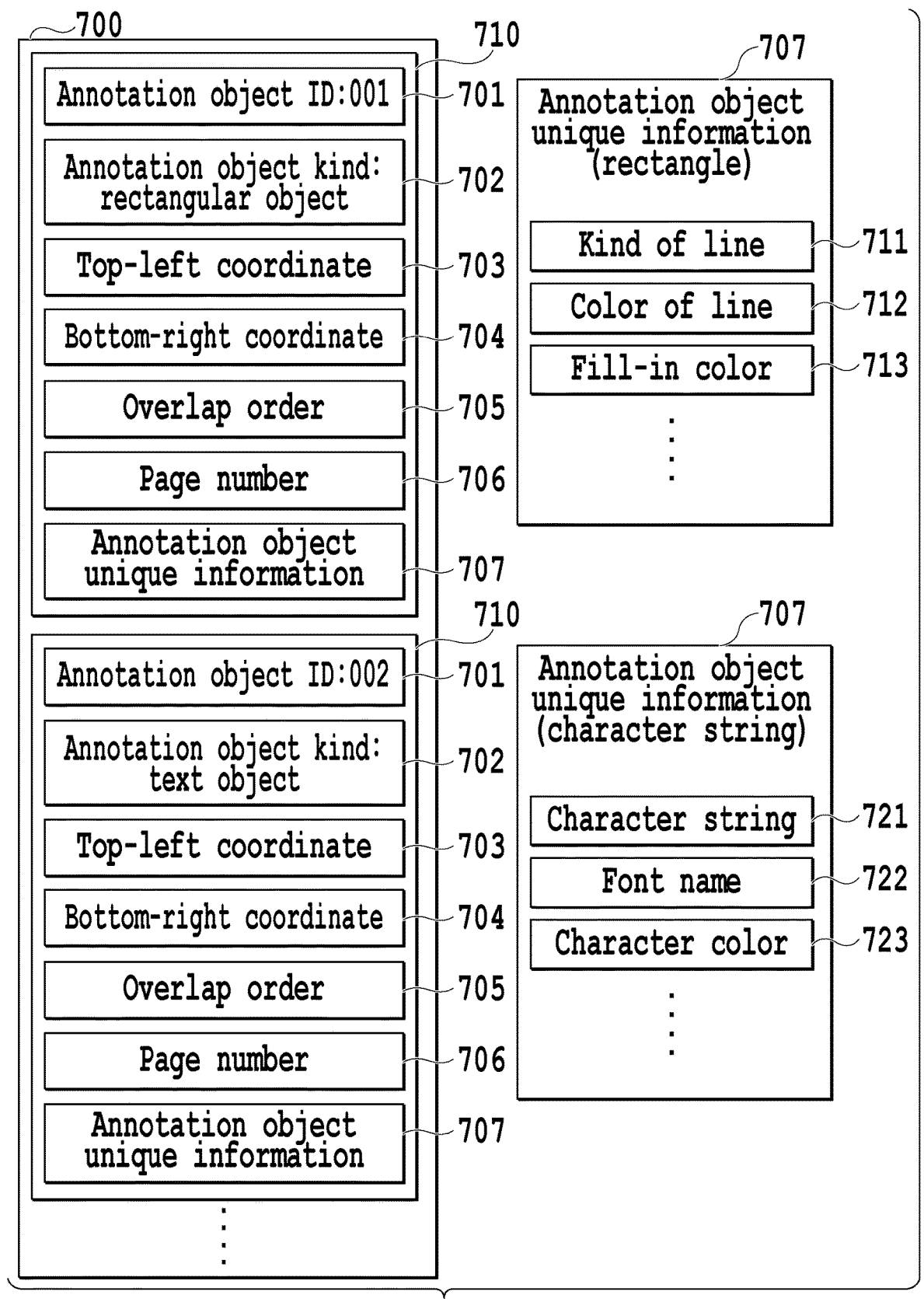
FIG. 7 is a diagram showing a data structure of an annotation object.

FIG. 7 is a diagram for explaining a data structure of an annotation object that is used as annotation data of each page of document data and showing a list (hereinafter, annotation object list) 700 to manage information relating to an annotation object arranged on each page. As shown schematically, each annotation object has information on items indicated by symbols 701 to 707.

Annotation object ID 701 is an ID to identify an annotation object. Annotation object kind 702 is information indicating the kind of the annotation object. Top-left coordinate 703 is information (value) indicating the top-left coordinates of the rectangle of the annotation object. Bottom-right coordinate 704 is information (value) on the bottom-right coordinate of the rectangle of the annotation object. Overlap order 705 is information indicating the order of drawing in the case where the annotation objects overlap each other (i.e., indicating whether an annotation object is drawn on or under another annotation object that overlaps the annotation object). Page number 706 is a page number of a page on which the annotation object is arranged.

Annotation object unique information 707 is unique information for each annotation object. For example, in the case where the annotation object is a rectangular object, in Annotation object unique information 707, information on items indicated by symbols 711 to 713 is included as shown schematically. Kind of line 711 is information indicating the kind of the line of the rectangle. Color of line 712 is color information on the line of the rectangle. Fill-in color 713 is information on a color with which the inside of the rectangle is filled in. Further, for example, in the case where the annotation object is a text object, in Annotation object unique information 707, information on items indicated by symbols 721 to 723 is included as shown schematically. Character string 721 is a character string of the text object. Font name 722 is information indicating a specified font. Character color is color information on a character.

As described above, a data group (hereinafter, annotation object information) 710 corresponding to each annotation object is held in the annotation object list 700. It may also be possible to make up the annotation object list 700 so as to have one list for all the annotation object data or so as to have one list for each page.

<About Layer Structure of Document Data>

Figure 8:
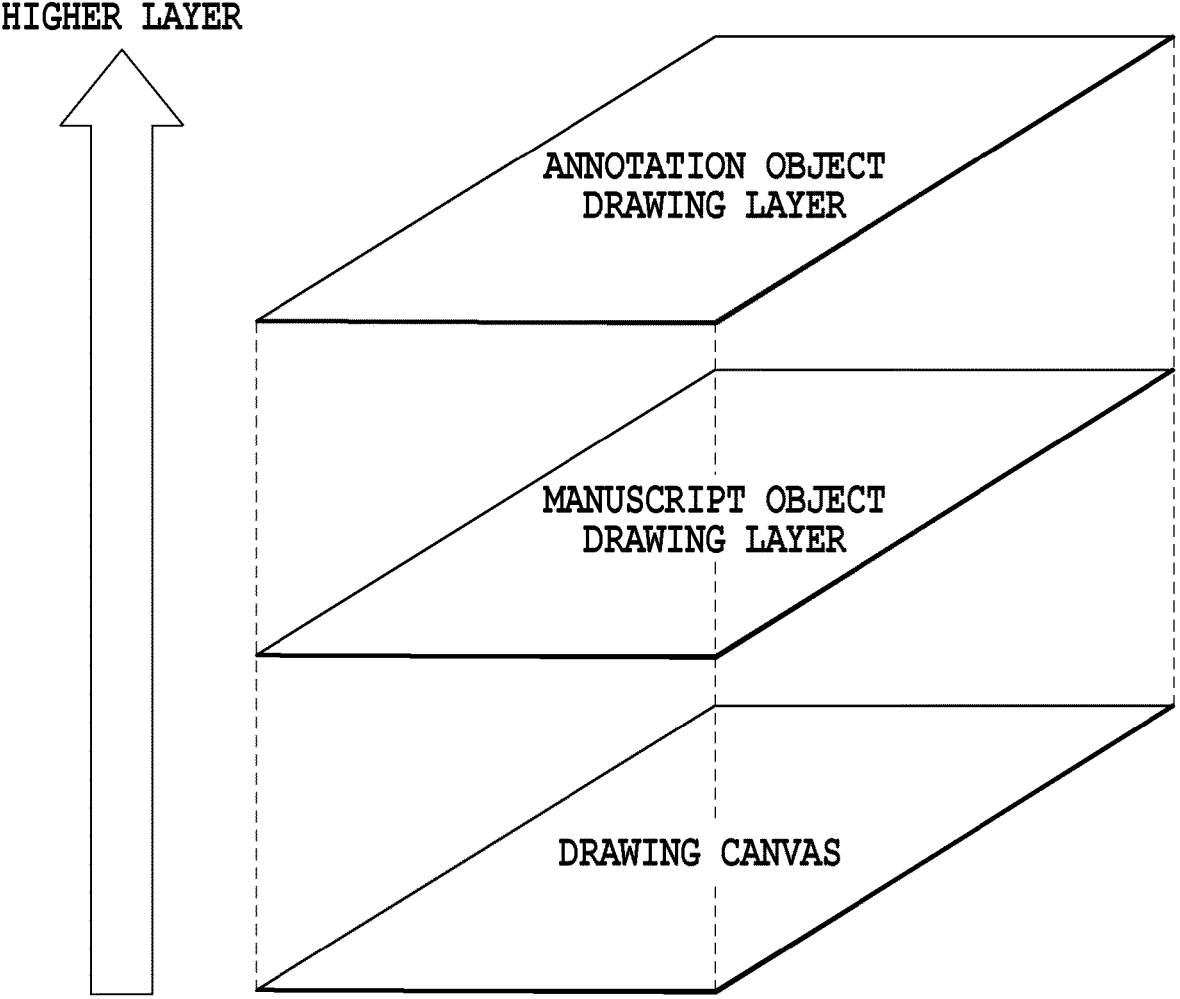
FIG. 8 is a diagram showing a layer structure of document data.

FIG. 8 is a diagram schematically showing a layer structure of document data. As shown schematically, the document data includes a drawing canvas, a manuscript object drawing layer to draw a manuscript object, and an annotation object drawing layer to draw an annotation object, and over the manuscript object drawing layer, the annotation object drawing layer exists. That is, the annotation object is drawn higher than the manuscript object. Consequently, in the case where the annotation object exists at the same coordinates as those of the manuscript object, the annotation object that is drawn in the higher layer is displayed with priority in principle, and therefore, the manuscript object is not displayed.

<About Data Structure of Document Search Information>

Figure 9:
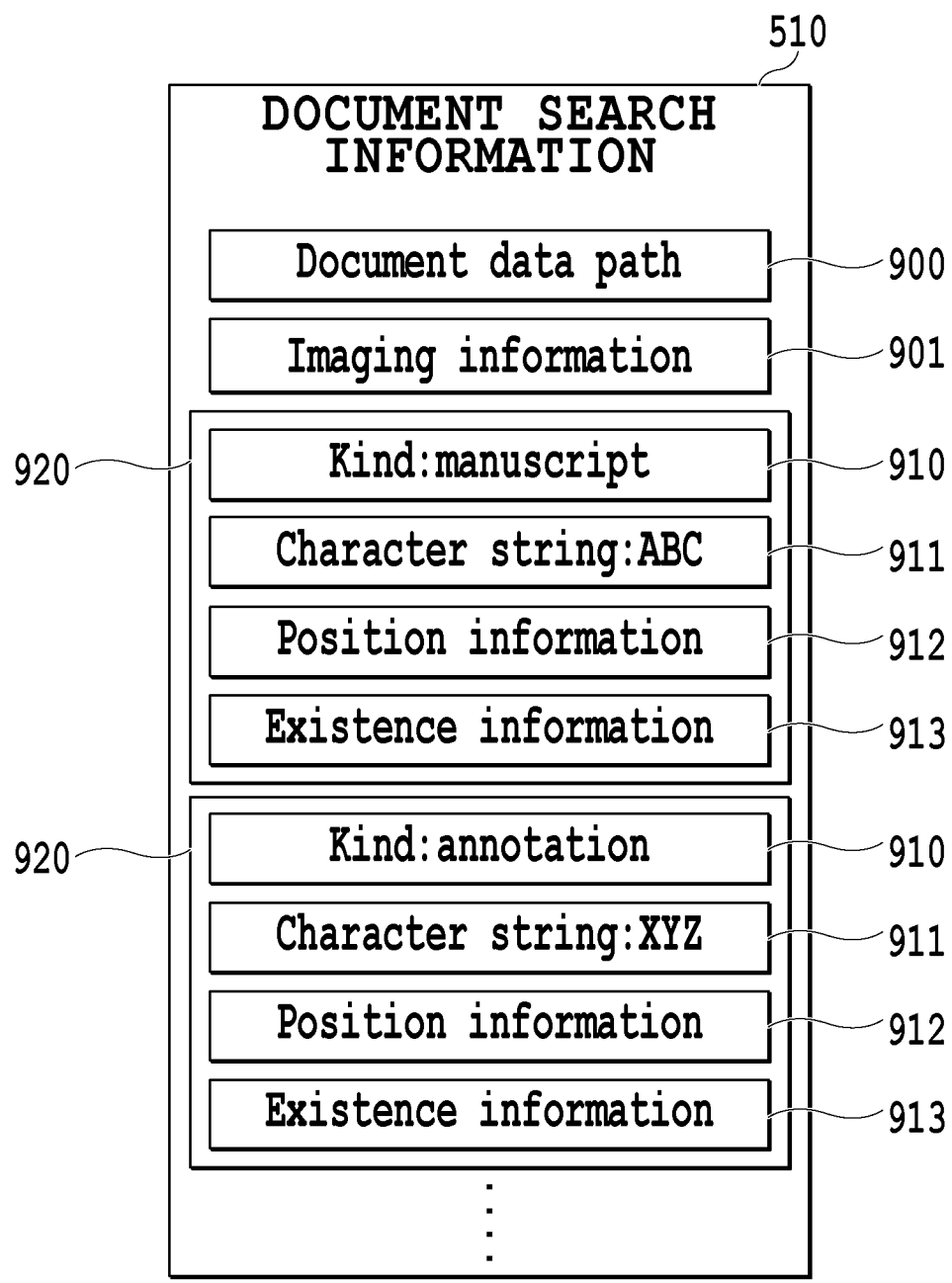
FIG. 9 is a diagram showing a data structure of document search information.

FIG. 9 is a diagram showing an example of the document search information 510 (see FIG. 5) used to search for document data. As shown schematically, the document search information 510 has information on items indicated by symbols 900, 901, and 910 to 913.

Document data path 900 is a path to the document data 500. Imaging information 901 is information indicating whether or not the document data 500 has been imaged. Kind 910 is information indicating the kind of the text object (i.e., indicating whether the text object is a manuscript object or an annotation object). Character string 911 is a character string of the text object. Position information 912 is information indicating the position of the text object (specifically, page number and coordinate values). Existence information 913 is information indicating whether or not a text object exists in the document data 500. For example, in the case where embedment of a text object in document data is not performed at the time of performing of imaging processing for document data, this text object is in the state of not existing in the imaged document data. Consequently, in this case, in the document search information 510 corresponding to the imaged document data, Existence information 913 on the text object becomes a value indicating that the text object does not exist in the document data. A data group (hereinafter, text object information) 920 corresponding to each text object such as this is included in the document search information 510.

The document management device 210 performs search processing using the document search information 510. Specifically, the document management device 210 determines whether the character string specified by a user coincides with Character string 911 included in the document search information 510 in accordance with the search conditions input by using the search boxes 441 (see FIG. 4) on the GUI screen. In the case where the results of the determination indicate that the text object information 920 that coincides exists, the document data 500 indicated by Document data path 900 is presented to a user by displaying the document data 500 on the document data display pane 430. At the time of searching for document data, it is also possible for a user to specify the kind of the text object (one of the manuscript object and the annotation object) by using the search boxes 441. In this case, search result that also takes into consideration information on Kind 910, in addition to information on Character string 911, is displayed on the document data display pane 430. That is, in the case where the character string specified by a user coincides with Character string 911 and the text object information 920 whose Kind 910 coincides with the kind of the text object specified by a user exists, the document data 500 indicated by Document data path 900 is displayed. Here, the case is explained where a search is performed by using the document search information 510, but it may also be possible to perform a search by using the text object embedded in the imaged document data, to be described later.

<About Analysis of Manuscript Object and Annotation Object>

Processing to analyze a manuscript object and to hold information obtained by the analysis in a manuscript object list and processing to analyze an annotation object and to hold information obtained by the analysis in an annotation object list are explained. The processing is performed by the analysis unit 204 accessing document data stored in the memory, such as the external memory 109, in accordance with instructions input from the editing unit 202.

Figures 10A, 10B, 10C:
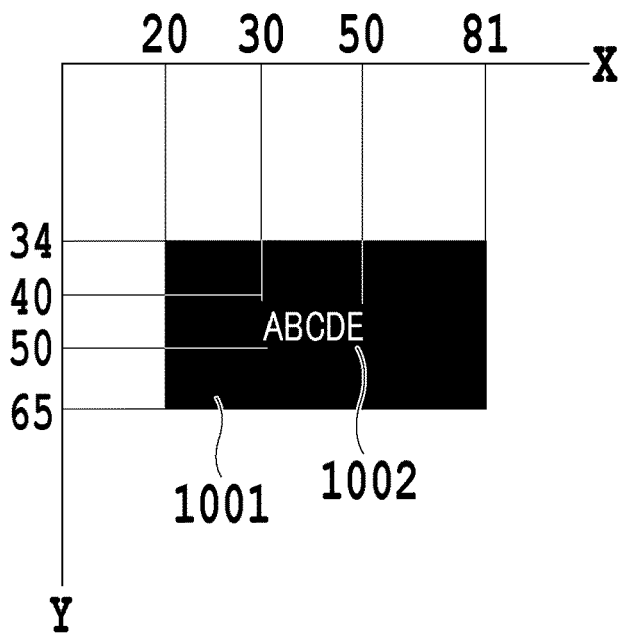
FIG. 10A, FIG. 10B, and FIG. 10C are explanatory diagrams of manuscript object analysis processing.

FIG. 10A, FIG. 10B, and FIG. 10C are diagrams for explaining analysis processing of a manuscript object and FIG. 10A shows two manuscript objects. As shown schematically, on a manuscript object 1001 that is a rectangular object, a manuscript object 1002 that is a text object exists.

FIG. 10B and FIG. 10C are diagrams showing information obtained by analyzing these manuscript objects. FIG. 10B shows information relating to the manuscript object 1001 of the information that is held in the manuscript object list and FIG. 10C shows information relating to the manuscript object 1002. As shown in FIG. 10A and FIG. 10B, a rectangular area represented by top-left coordinates (20, 34) and bottom-right coordinates (81, 65) is the area in which the manuscript object 1001 exists and the rectangular area such as this is defined as an "existence area". Further, the manuscript object 1002 is arranged on the manuscript object 1001, and therefore, the value of Overlap order of the manuscript object 1001 is a value of 0 indicating that the manuscript object 1001 is drawn under the manuscript object 1002. On the other hand, the value of Overlap order of the manuscript object 1002 is a value of 1 indicating that the manuscript object 1002 is drawn on the manuscript object 1001 as shown in FIG. 10C. In the case where the value of Overlap order of the manuscript object 1001 is 1 and the value of Overlap order of the manuscript object 1002 is 0, the manuscript object 1001 is drawn on the manuscript object 1002, and therefore, a character string ABCDE is not displayed.

Figure 11:
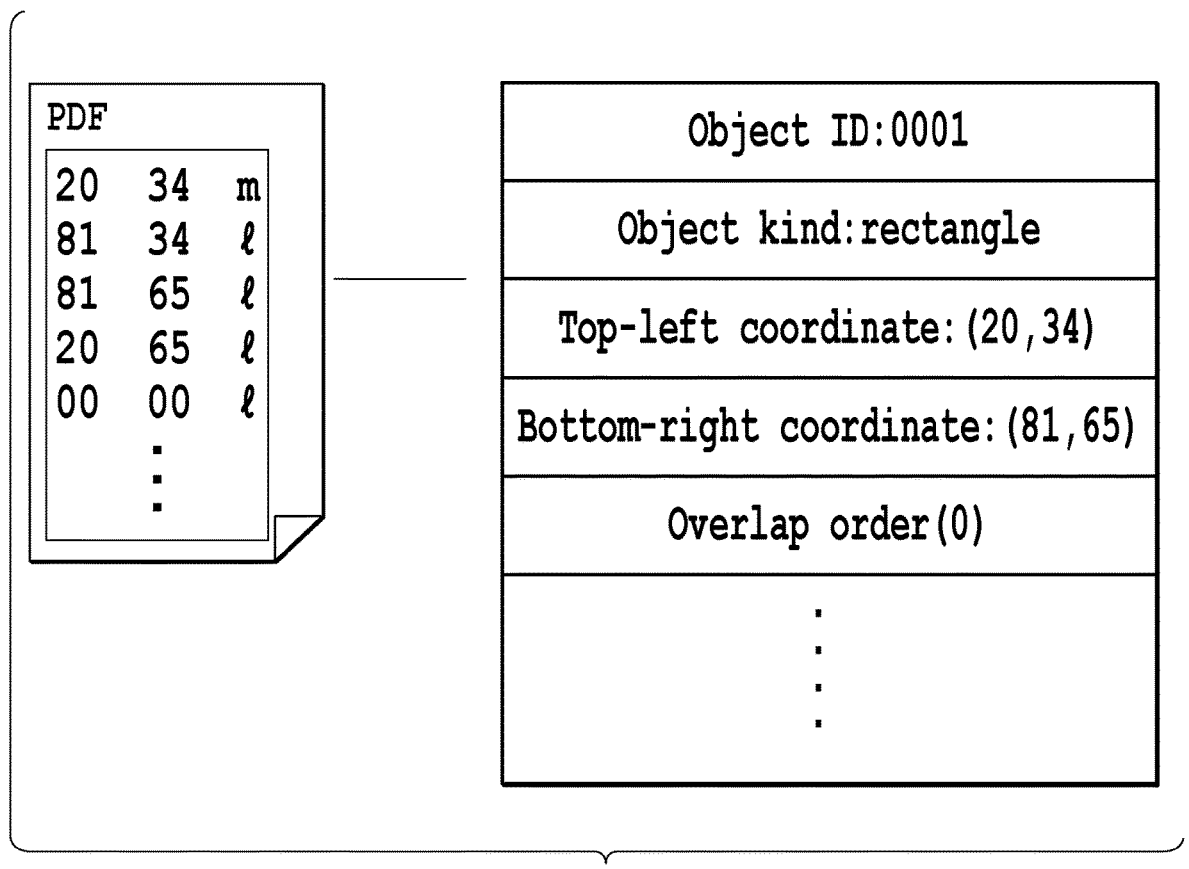
FIG. 11 is a diagram showing an example in which data is read from an internal format of document data.

FIG. 11 is a diagram showing an example in which a manuscript object similar to the manuscript object 1001 in FIG. 10A is read from an internal format of document data and information is taken out. In FIG. 11, binary data is shown as an internal format, but the data may be data in a text format, such as XML (Extensible Markup Language).

In the above-described explanation, the case is explained where information obtained by analyzing a manuscript object is held in the manuscript object list, but this is also the same in the case where information obtained by analyzing an annotation object is held in the annotation object list. That is, the analysis unit 204 accesses document data stored in the memory, analyzes the annotation object, and holds information obtained by the analysis in the annotation object list. Hereinafter, in the case where the manuscript object and the annotation object are represented together, these are referred to as an "object".

<About Imaging Processing for Document Data>

Figure 12:
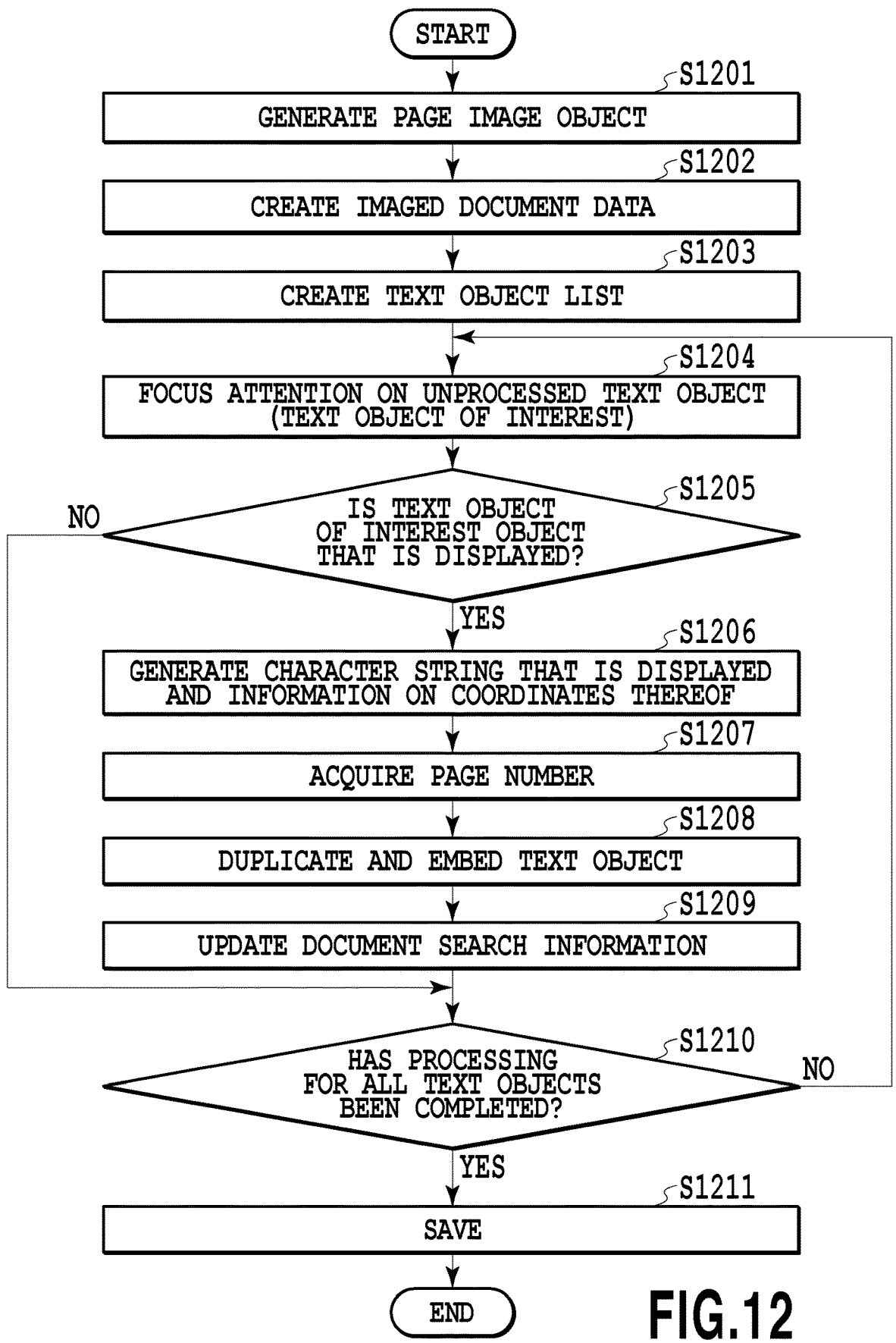
FIG. 12 is a flowchart of imaging processing for document data in the first embodiment.

FIG. 12 is a flowchart showing a flow of imaging processing for document data in the present embodiment. Here, the imaging processing for document data means processing including generation of a page image object based on the object of each page for each page of the document data and creation of document data including the generated page image object (imaged document data). The imaging processing for document data shown below is started by a user pressing down the Export button 312 on the GUI screen (see FIG. 3A) of the document editing device 200.

At step S1201, the editing unit 202 generates one page image object representing the entire page based on one or a plurality of drawing objects within the page for each page of the document data. The page image object is a manuscript object arranged in the manuscript object drawing layer.

At step S1202, the editing unit 202 creates imaged document data, which takes each page image object generated at step S1201 as page data of each page.

Figure 13:
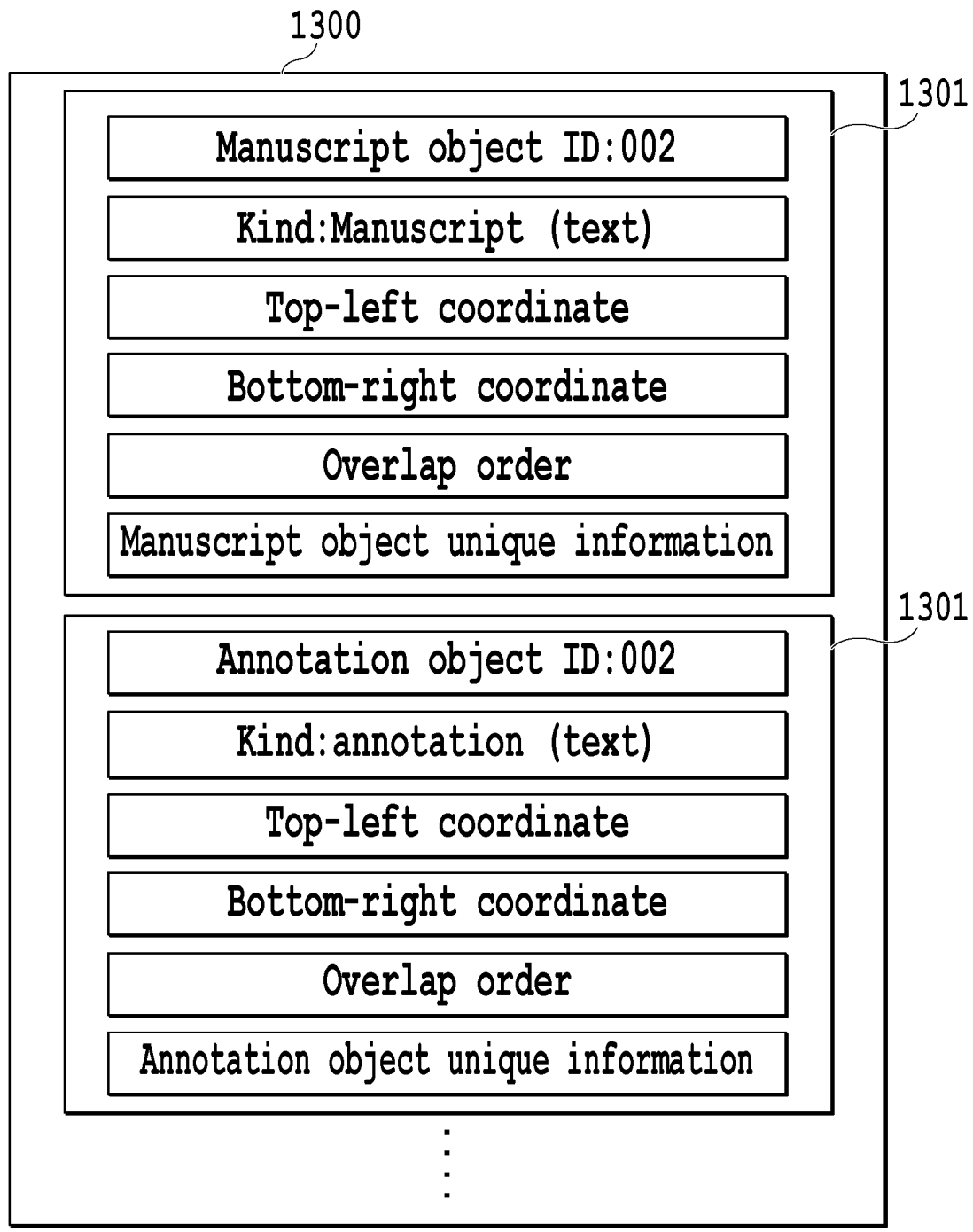
FIG. 13 is a diagram showing a text object list in the first embodiment.

At step S1203, the analysis unit 204 analyzes the document data for which imaging processing is to be performed and creates the manuscript object list 600 and the annotation object list 700 of the document data. The manuscript object list 600 and the annotation object list 700 are delivered to the editing unit 202. The editing unit 202 acquires all the manuscript object information 610 having information on a character string from the delivered manuscript object list 600 and also acquires all the annotation object information 710 having information on a character string from the delivered annotation object list 700. Then, the editing unit 202 creates a list of text objects (hereinafter, text object list) included in the document data for which imaging processing is to be performed based on the manuscript object information 610 and the annotation object information 710 that are acquired. FIG. 13 shows an example of the text object list created at this step. As shown schematically, a text object list 1300 holds a data group (text object information) 1301 corresponding to each text object.

At step S1204, the editing unit 202 focuses attention on one of unprocessed text objects in the text object list 1300 created at step S1203 and acquires the text object information 1301 corresponding to the text object on which attention is focused. The text object on which attention is focused at this step is called a "text object of interest".

At step S1205, the editing unit 202 determines whether the text object of interest is an object that is displayed in a state where a user can visually recognize it. In the case where the results of the determination at step S1205 are affirmative, the processing advances to step S1206. On the other hand, in the case where the results of the determination are negative, the processing advances to step S1210. The processing at step S1205 will be described later by using FIG. 14.

At step S1206, the editing unit 202 generates a character string of the text object of interest that is displayed in a state where a user can visually recognize it and information on the coordinates thereof. The processing at step S1206 will be described later by using FIG. 14.

At step S1207, the editing unit 202 refers to the text object information 1301 acquired at step S1204 and acquires the page number indicating a page on which the text object of interest exists.

At step S1208, the editing unit 202 duplicates the text object based on the text object information 1301 on the text object of interest. Then, the editing unit 202 inserts the duplicated text object at a predetermined position in the imaged document data, which is created at step S1202, i.e., at the position indicated by the page number acquired at step S1207 and the coordinates acquired at step S1206 in an undisplayed state (embedment processing). The undisplayed state is, for example, a state where the text object is transparent.

At step S1209, the editing unit 202 updates the document search information 510 corresponding to the imaged document data. Specifically, the editing unit 202 sets Imaging information 901 to a value indicating that the document data has been imaged and adds the text object information 920 corresponding to the text object of interest. In this text object information 920, Kind 910 is set to a value indicating that the kind of the text object of interest is a manuscript object or an annotation object in accordance with the kind of the text object of interest (i.e., whether the text object of interest is the manuscript object or the annotation object). Character string 911 is set to the character string acquired at step S1206. Further, Position information 912 is set to information indicating a predetermined position, i.e., the page number acquired at step S1207 and the coordinates acquired at step S1206. Furthermore, Existence information 913 is set to a value indicating that a text object exists in the document data. The text object of interest that is handled at this step is an object that is displayed in a state where a user can visually recognize it (YES at step S1205), and therefore, duplication and embedment of the text object are performed without fail (step S1208). Consequently, at this step, Existence information 913 is set to a value at all times indicating that a text object exists in the document data. As described above, by creating the text object information 920 for each text object of interest and adding it to the document search information 510, the document search information 510 is updated.

At step S1210, the editing unit 202 determines whether the processing for all the text objects included in the text object list 1300 has been completed. In the case where the results of the determination at step S1210 are affirmative, the processing advances to step S1211. On the other hand, in the case where the results of the determination are negative, the processing returns to step S1204.

At step S1211, the editing unit 202 instructs the saving unit 203 to save the imaged document data and the document search information corresponding thereto and the saving unit 203 saves the imaged document data and the document search information.

Figure 14:
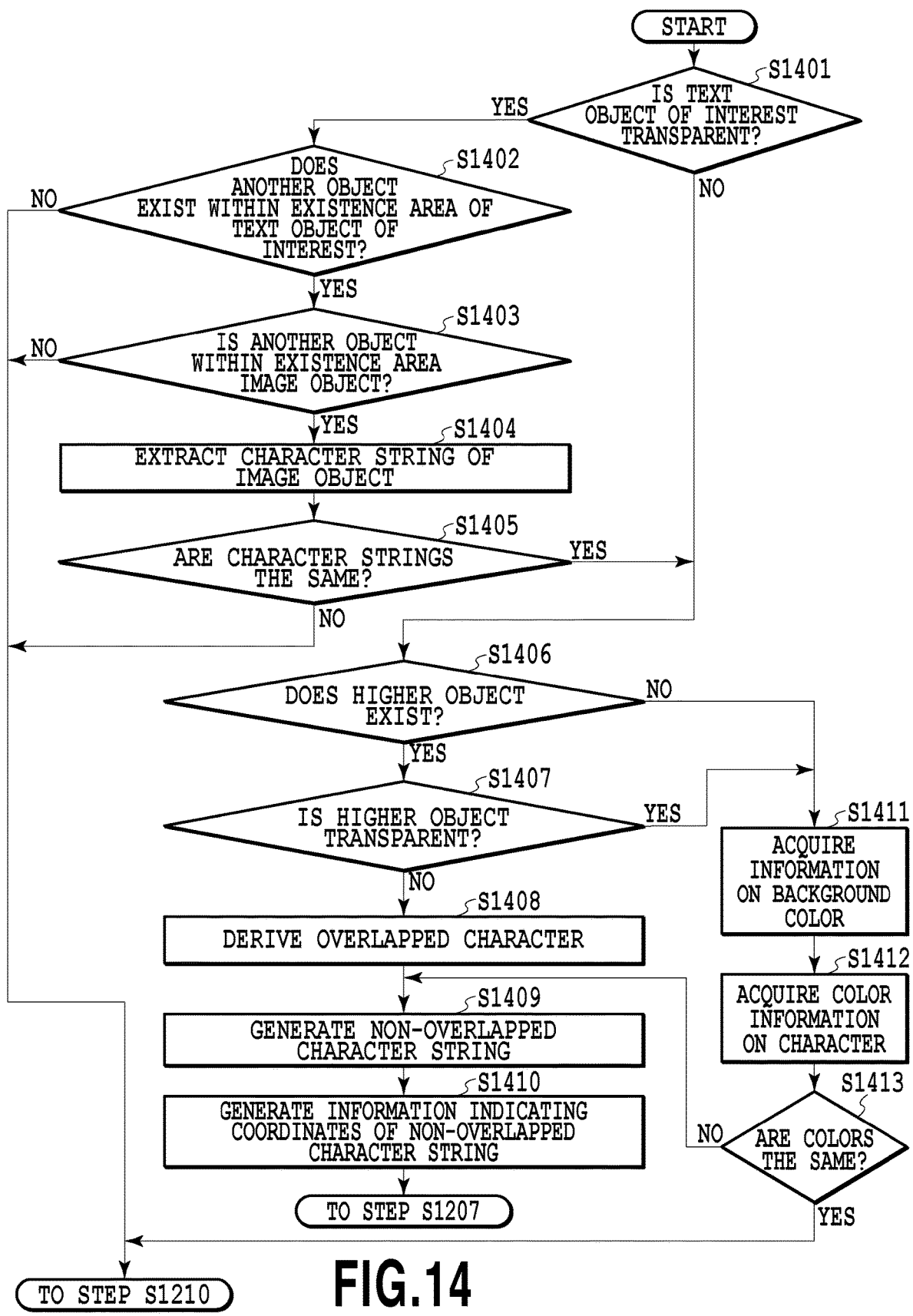
FIG. 14 is a detailed flowchart of part of a process in imaging processing of the first embodiment.

FIG. 14 is a detailed flowchart of the processing at step S1205 and step S1206 in FIG. 12.

At step S1401, the editing unit 202 determines whether the text object of interest is transparent. In the case where the text object of interest is a manuscript object, this determination is performed based on the color information on the character (Character color 623) included in the manuscript object unique information of the text object information 1301 corresponding to the text object of interest. On the other hand, in the case where the text object of interest is an annotation object, the determination is performed based on Character color 723. In the case where the results of the determination at step S1401 are affirmative, the processing advances to step S1402. On the other hand, in the case where the results of the determination are negative, the processing advances to step S1406.

At step S1402, the editing unit 202 refers to the manuscript object list 600 and the annotation object list 700 of the document data for which imaging processing is to be performed and determines whether another object exists within the existence area of the text object of interest. In the case where the results of the determination at step S1402 are affirmative, the processing advances to step S1403. On the other hand, in the case where the results of the determination are negative, the processing advances to step S1210.

At step S1403, the editing unit 202 determines whether another object within the existence area is an image object. This determination is performed based on information indicating the kind of object relating to another object within the existence area (i.e., Manuscript object kind 602 or Annotation object kind 702). In the case where the results of the determination at step S1403 are affirmative, the processing advances to step S1404. On the other hand, in the case where the results of the determination are negative, the processing advances to step S1210.

At step S1404, the editing unit 202 extracts and acquires a character string corresponding the image object by performing optical character recognition (hereinafter, OCR) processing for the existence area of the image object.

At step S1405, the editing unit 202 determines whether the character string of the text object of interest is the same as the character string acquired at step S1404. In the case where the results of the determination at step S1405 are affirmative, the processing advances to step S1406. On the other hand, in the case where the results of the determination are negative, the processing advances to step 1210.

The processing at steps S1401 to S1405 is processing that takes into consideration the possibility that the document data holds a transparent text object because the document data has been subjected to the OCR processing in advance. By the series of processing, even in the case where the character string of the text object is not displayed in a state where it can be visually recognized because the text object itself is transparent, on a condition that an equivalent character string is displayed by the image object, it is made possible to include the character string in the targets that can be searched for.

At step S1406, the editing unit 202 determines whether a higher object of the text object of interest exists by referring to the manuscript object list 600 and the annotation object list 700 of the document data for which imaging processing is to be performed. Here, the higher object is an object that is located within the existence area of the text object of interest and which is arranged higher than the text object of interest so as to overlap it. In the case where the results of the determination at step S1406 are affirmative, the processing advances to step S1407. On the other hand, in the case where the results of the determination are negative, the processing advances to step S1411.

At step S1407, the editing unit 202 determines whether the higher object is transparent. This determination is performed based on the object information on the higher object. For example, in the case where the higher object is a rectangular manuscript object, the determination at step S1407 is performed based on the fill-in color information (Fill-in color 613) of the corresponding manuscript object information 610. In the case where the results of the determination at step S1407 are affirmative, the processing advances to step S1411. On the other hand, in the case where the results of the determination are negative, the processing advances to step S1408.

Figure 15:
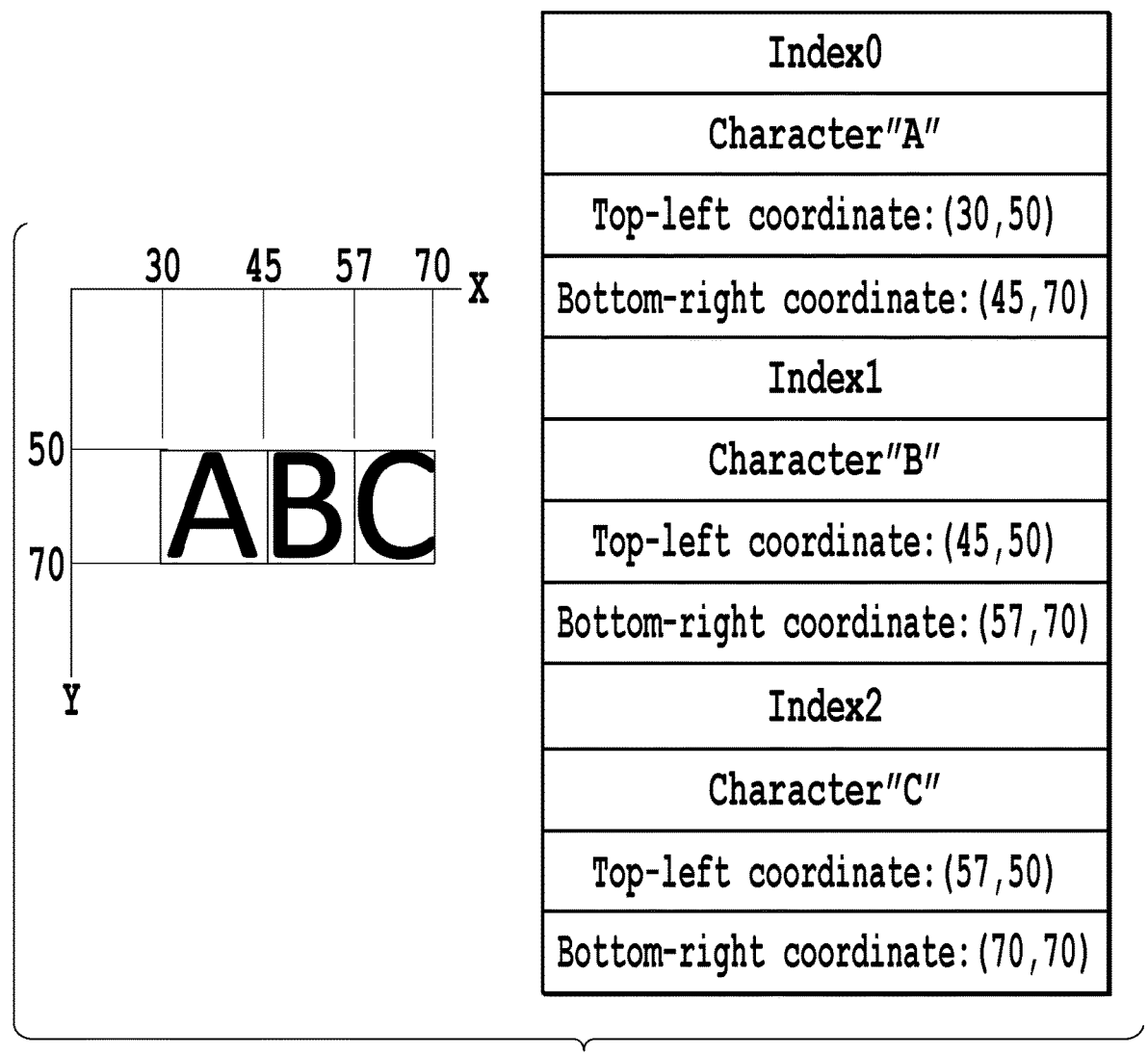
FIG. 15 is an explanatory diagram of analysis processing of each character of a text object in the first embodiment.

At step S1408, the editing unit 202 derives a character (hereinafter, overlapped character) of the text object of interest that is not displayed in a state where a user can visually recognize it because the text object of interest and the higher object overlap. Specifically, as shown in FIG. 15, for the character string of the text object of interest, the top-left coordinates and the bottom-right coordinates are acquired for each individual character and the rectangular area (existence area) for each individual character is derived. Then, the existence area for each individual character and the existence area of the higher object are compared. By doing so, for each character of the character string of the text object of interest, whether the character is overlapped by the higher object is determined and the overlapped character is derived.

At step S1409, the editing unit 202 generates a character string (hereinafter, non-overlapped character string) of the character string of the text object of interest, which is displayed in a state where a user can visually recognize it because at least part of the object of interest does not overlap the higher object. The non-overlapped character string is generated by excluding the overlapped character from the character string of the text object of interest. In the case where all the characters of the text object of interest are overlapped characters, this step is not performed. The non-overlapped character string that is acquired at this step is used for updating processing of the document search information at step 1209.

At step S1410, the editing unit 202 generates information indicating the coordinates of the non-overlapped character string generated at step S1409 based on the coordinates for each character of the character string. As an example, the case is discussed where AB of the character string ABC in FIG. 15 is a non-overlapped character string and C is an overlapped character. In this case, the top-left coordinates (30, 50) of the character A and the bottom-right coordinates (57, 70) of the character B are information indicating the coordinates of the non-overlapped character string. After this step is completed, the processing advances to step S1207.

The processing at steps S1406 to S1410 is processing that takes into consideration the possibility that the character string of the text object is in the hidden state because of another object arranged higher than the text object. By this series of processing, in the case where part of the character string of the text object is hidden, it is made possible to include only the character string that is not hidden (that a user can visually recognize) in the targets that can be searched for.

At step S1411, the editing unit 202 acquires information on the background color of the text object of interest. Here, the background color is the color of the background object in the case where another object (hereinafter, background object) arranged directly under the text object of interest exists, and the background color is white in the case where the background object does not exist.

At step S1412, the editing unit 202 acquires color information on the character of the text object of interest.

At step S1413, the editing unit 202 determines whether the background color and the color of the character are the same based on the information on the background color acquired at step S1411 and the color information on the character acquired at step S1412. In the case where the results of the determination at step S1413 are affirmative, the processing advances to step S1210. On the other hand, in the case where the results of the determination are negative, the processing advances to step S1409.

The processing at steps S1411 to S1413 is processing that takes into consideration the possibility that the color of the character of the text object and the background color are the same. By this series of processing, in the case where the color of the character of the text object and the background color are the same, it is made possible to exclude the character string from the targets that can be searched for by regarding the character string of the text object as not being displayed in a state where a user can visually recognize it.

Second Embodiment

In the first embodiment, at the time of imaging processing for document data, the object of the character string that is displayed in a state where a user can visually recognize it is embedded in the imaged document data in its entirety whether the object is a manuscript object or an annotation object. However, the case is considered where a user desires to disable a search using a character string that is displayed in a document image or a user desires to embed one of a manuscript object and an annotation object in imaged document data. Consequently, in the present embodiment, it is made possible for a user to select whether or not to enable a search using a character string that is displayed in a state where a user can visually recognize it, and in the case where a user selects to enable the search, to select to embed which text object in the imaged document data. In the following, explanation of the contents in common to those of the first embodiment is omitted appropriately.

<About Dialog of GUI>

FIG. 16 shows a dialog of a GUI in the present embodiment. At the time of performing imaging processing for document data, a user performs settings relating to extraction of a search character string via a search setting dialog 1600. The search setting dialog 1600 is displayed in the case where a search setting control button (not shown schematically) on the GUI screen (see FIG. 3A) of the document editing device 200 is pressed down.

As shown schematically, the search setting dialog 1600 has three checkboxes 1601 to 1603. The checkbox 1601 is a checkbox to set whether or not to enable a search using a character string that is displayed in a state where a user can visually recognize it at the time of imaging processing for document data. In the state where the checkbox 1601 is checked, it is made possible to check the checkboxes 1602 and 1603. The checkbox 1602 is a checkbox to set whether or not to embed the manuscript object of the text object in the imaged document data. The checkbox 1603 is a checkbox to set whether or not to embed the annotation object of the text object in the imaged document data. The information input by a user using the checkboxes 1601 to 1603 of the search setting dialog 1600 is saved as document search information 1700 (see FIG. 17) corresponding to the imaged document data.

<About Document Search Information>

Figure 17:
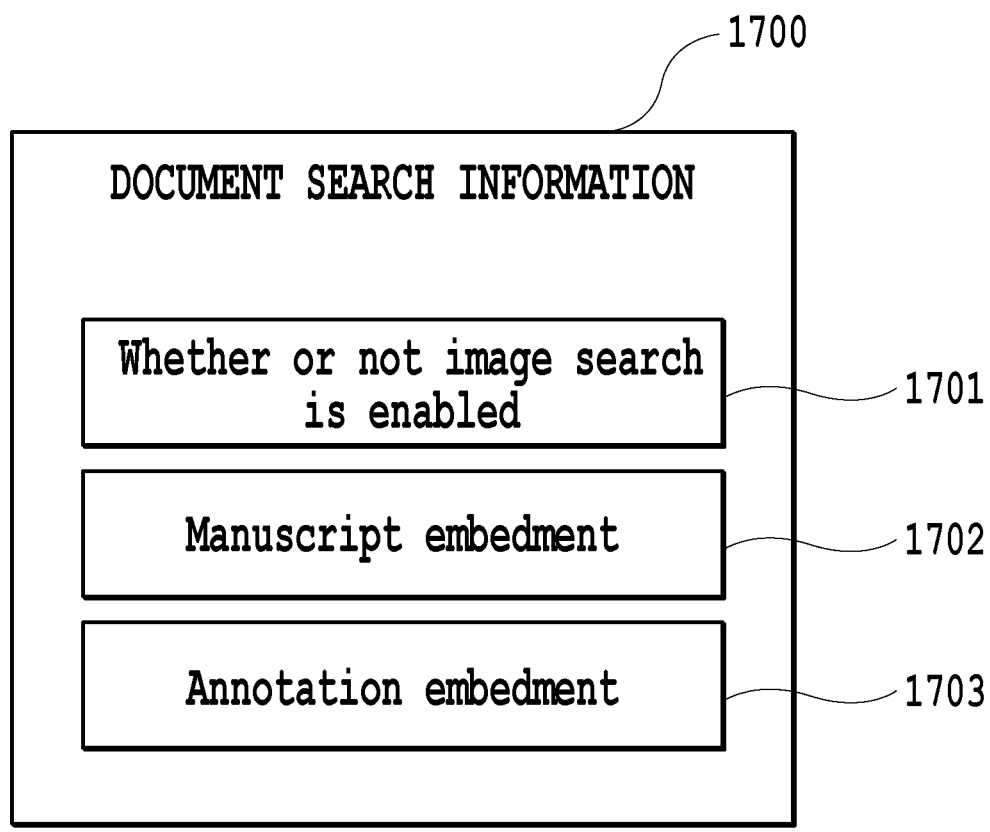
FIG. 17 is a diagram showing a data structure of document search information in the second embodiment.

FIG. 17 is a diagram showing an example of document search information in the present embodiment. As shown schematically, the document search information 1700 includes information on items indicated by symbols 1701 to 1703. Although not shown schematically, the document search information 1700 also includes the information on the items indicated by symbols 900, 901, and 910 to 913 shown in FIG. 9 as in the first embodiment.

Whether or not image search is possible 1701 is information indicating whether or not a search using a character string is possible for imaged document data. In the case where imaging processing is performed in the state where the checkbox 1601 of the search setting dialog 1600 is checked, Whether or not image search is possible 1701 becomes a value indicating that a search using a character string is possible for imaged document data. On the other hand, in the case where imaging processing is performed in the state where the checkbox 1601 is not checked, Whether or not image search is possible 1701 becomes a value indicating that a search using a character string is not possible for imaged document data.

Manuscript embedment 1702 is information indicating whether or not the manuscript object of the text object is embedded in the imaged document data. In the case where imaging processing for document data is performed in the state where the checkbox 1602 is checked, Manuscript embedment 1702 becomes a value indicating that the manuscript object of the text object is embedded in the imaged document data. On the other hand, in the case where imaging processing for document data is performed in the state where the checkbox 1602 is not checked, Manuscript embedment 1702 becomes a value indicating that the manuscript object of the text object is not embedded in the imaged document data.

Annotation embedment 1703 is information indicating whether or not the annotation object of the text object is embedded in the imaged document data. In the case where imaging processing for document data is performed in the state where the checkbox 1603 is checked, Annotation embedment 1703 becomes a value indicating that the annotation object of the text object is embedded in the imaged document data. On the other hand, in the case where imaging processing for document data is performed in the state where the checkbox 1603 is not checked, Annotation embedment 1703 becomes a value indicating that the annotation object of the text object is not embedded in the imaged document data.

<About Processing to Create Image Data>

Figure 18:
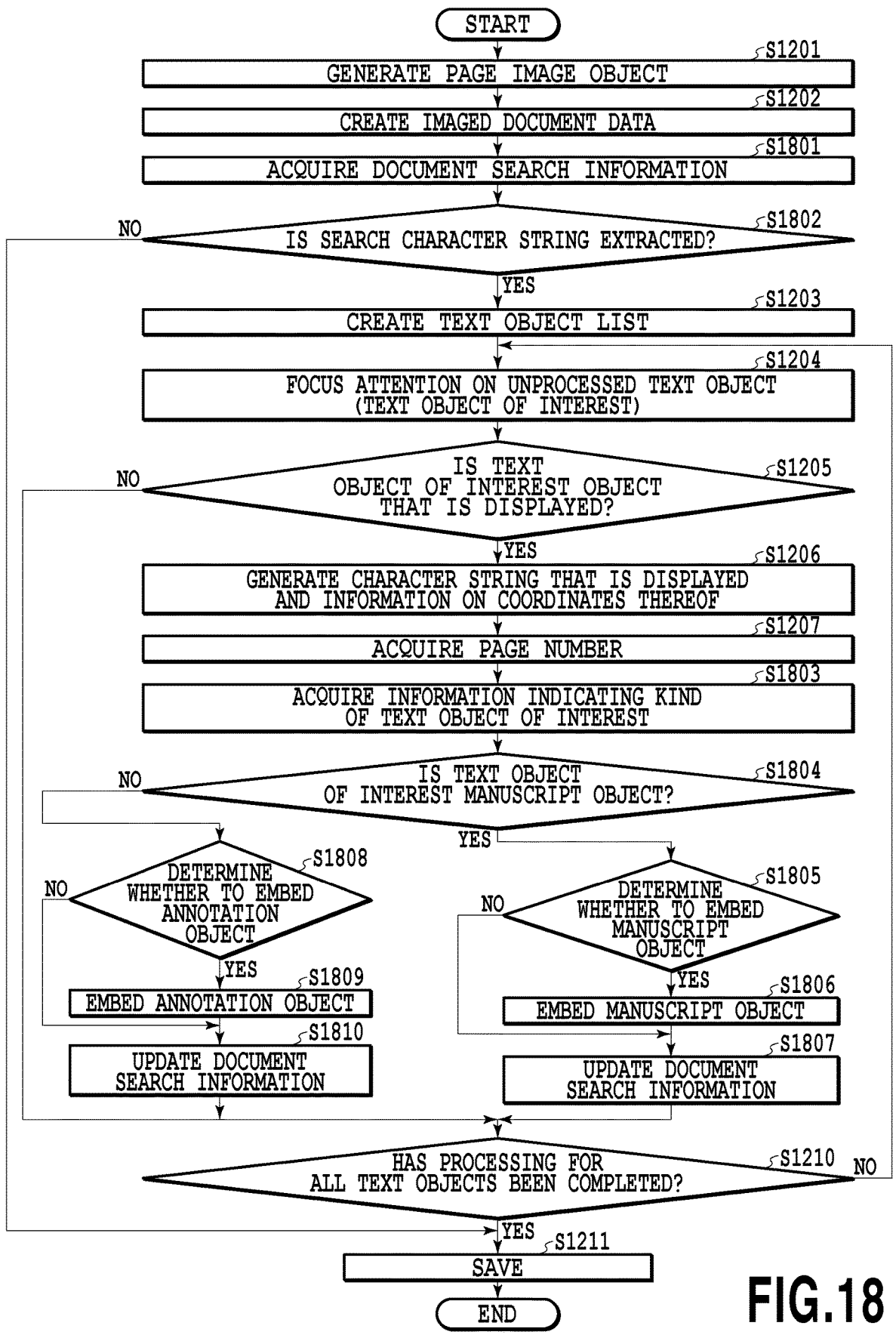
FIG. 18 is a flowchart of imaging processing for document data in the second embodiment.

FIG. 18 is a flowchart showing a flow of imaging processing for document data in the present embodiment.

At step S1201, the editing unit 202 generates a page image object based on one or a plurality of drawing objects of each page for each page of document data. At step S1202, the editing unit 202 creates imaged document data, whose page data of each page is each page image object generated at step S1201. As described above, step S1201 and step S1202 are the same as those in the first embodiment (see FIG. 12). However, in the present embodiment, after step S1202 the processing advances to step S1801.

At step S1801, the editing unit 202 acquires the document search information 1700.

At step S1802, the editing unit 202 determines whether to extract a search character string based on Whether or not image search is possible 1701 included in the document search information 1700 acquired at step S1801. In the case where the results of the determination at step S1802 are affirmative, the processing advances to step S1203. On the other hand, in the case where the results of the determination are negative, the processing advances to step S1211.

At step S1203, the editing unit 202 acquires a text object list corresponding to the document data for which imaging processing it to be performed. At step S1204, the editing unit 202 focuses attention on one of unprocessed text objects included in the text object list acquired at step S1203. At step S1205, the editing unit 202 determines whether the text object of interest is an object that is displayed in a state where a user can visually recognize it. At step S1206, the editing unit 202 generates the character string of the text object of interest, which is displayed in a state where a user can visually recognize it, and information on the coordinates thereof. At step S1207, the editing unit 202 refers to the text object information 1301 on the text object of interest and acquires the page number indicating a page on which the text object of interest exists. As described above, step S1203 to step S1207 are the same as those in the first embodiment (see FIG. 12). However, in the present embodiment, after step S1207, the processing advances to step S1803.

At step S1803, the editing unit 202 refers to the text object information 1301 on the text object of interest and acquires information indicating the kind of the text object of interest.

At step S1804, the editing unit 202 determines whether the text object of interest is a manuscript object based on the information indicating the kind of the text object of interest acquired at step S1803. In the case where the results of the determination at step S1804 are affirmative, the processing advances to step S1805. On the other hand, in the case where the results of the determination are negative (in the case where the text object of interest is an annotation object), the processing advances to step S1808.

At step S1805, the editing unit 202 determines whether to embed the text object of interest in the imaged document data based on the information (Document embedment 1702) indicating whether or not the manuscript object of the text object is embedded in the imaged document data. In the case where the results of the determination at step S1805 are affirmative, the processing advances to step S1806. On the other hand, in the case where the results of the determination are negative, the processing advances to step S1807.

At step S1806, the editing unit 202 performs the same processing as that at step S1208, i.e., embedment processing to insert the text object of interest (at this step, the manuscript text object) in the imaged document data.

At step S1807, the editing unit 202 performs the same processing as that at step S1209, i.e., updates the document search information 1700 corresponding to the imaged document data. At this time, Kind 910 (information indicating the kind of the text object of interest) is set to a value indicating that the text object of interest is a manuscript object. Further, Existence information 913 (information indicating whether or not the text object exists in the document data) is set based on whether or not a manuscript text object is embedded in the imaged document data at step S1806. That is, in the case where the manuscript text object is embedded in the imaged document data, Existence information 913 becomes a value indicating that a text object exists in the document data. On the other hand, in the case where the manuscript text object is not embedded in the imaged document data, Existence information 913 becomes a value indicating that no text object exists in the document data.

At step S1808, the editing unit 202 determines whether to embed the text object of interest in the imaged document data based on the information (Annotation embedment 1703) indicating whether or not the annotation object of the text object is embedded in the imaged document data. In the case where the results of the determination at step S1808 are affirmative, the processing advances to step S1809. On the other hand, in the case where the results of the determination are negative, the processing advances to step S1810.

At step S1809, the editing unit 202 performs the same processing as that at step S1208, i.e., the embedment processing to insert the text object of interest (at this step, the annotation text object) in the imaged document data.

At step S1810, the editing unit 202 performs the same processing as that at step S1209, i.e., updates the document search information 1700 corresponding to the imaged document data. At this time, Kind 910 (information indicating the kind of the text object of interest) is set to a value indicating that the text object of interest is an annotation object. Further, Existence information 913 is set based on whether or not the annotation text object is embedded in the imaged document data at step S1809. That is, in the case where the annotation text object is embedded in the imaged document data, Existence information 913 becomes a value indicating that a text object exists in the document data. On the other hand, in the case where the annotation text object is not embedded in the imaged document data, Existence information 913 becomes a value indicating that no text object exists in the document data.

By the present embodiment, it is made possible for a user to select whether or not to enable a search using a character string that is displayed in a document image at the time of imaging processing for document data, and in the case where a user selects to enable the search, to select to embed which text object in the imaged document data.

Third Embodiment

In the first embodiment and the second embodiment, by the imaging processing for document data, the imaged document data and the document search information associated with this are created. In the present embodiment, an aspect is explained in which it is made possible to update the document search information.

<About Updating Processing of Document Search Information>

Figure 19:
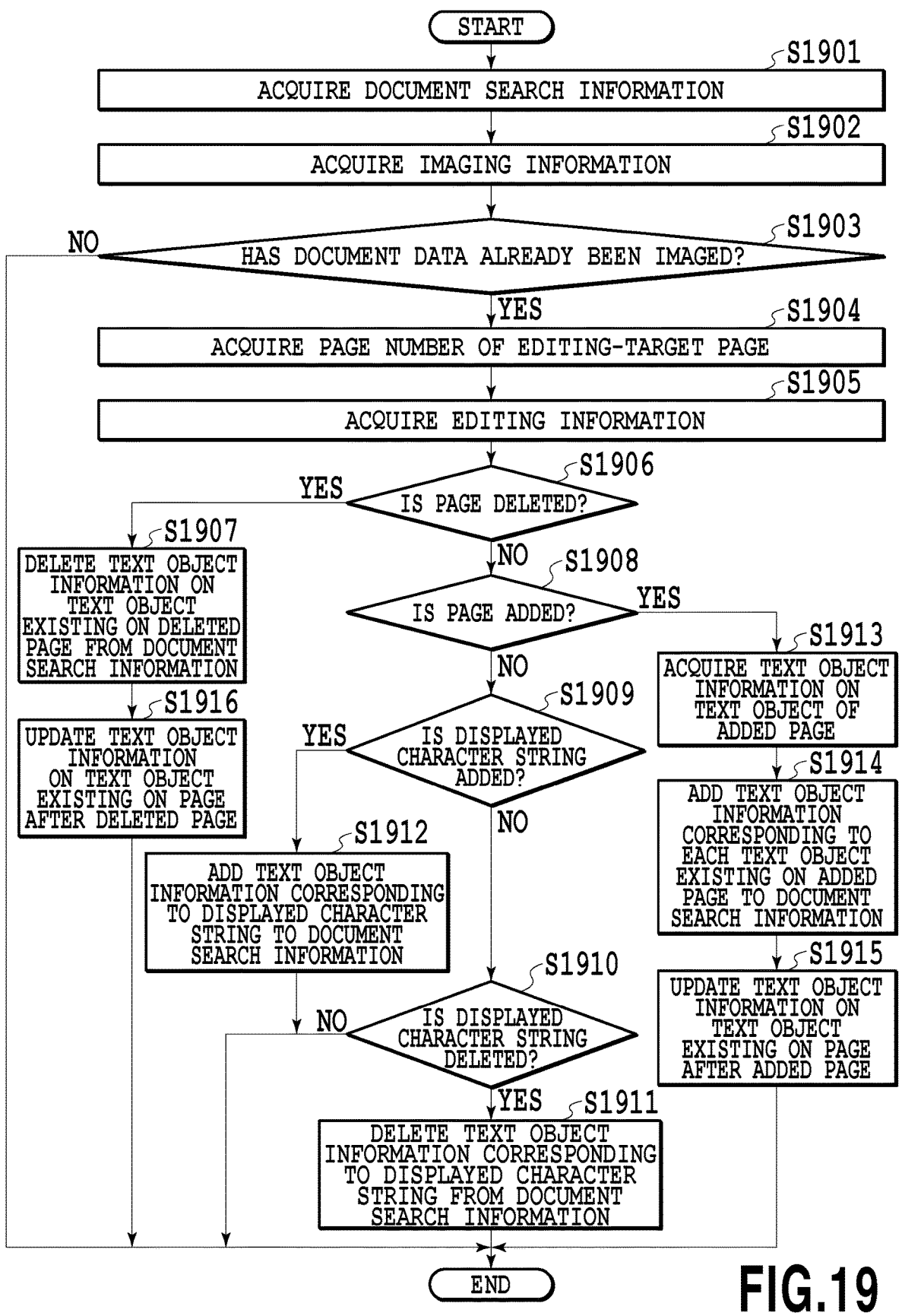
FIG. 19 is a flowchart of updating processing of document search information in a third embodiment.

FIG. 19 is a flowchart of the updating processing of the document search information at the time of editing the document data in the present embodiment. The updating processing of the document search information shown below is started by, for example a user pressing down the Annotation button 311 and inserting annotation on the GUI screen (see FIG. 3A) of the document editing device 200.

At step S1901, the editing unit 202 acquires the document search information 510.

At step S1902, the editing unit 202 acquires Imaging information 901 of the document search information 510 acquired at step S1901.

At step S1903, the editing unit 202 determines whether the processing-target document data has been imaged based on Imaging information 901 acquired at step S1902. In the case where the results of the determination at step S1903 are affirmative, the processing advances to step S1904. On the other hand, in the case where the results of the determination are negative, the series of processing is terminated.

At step S1904, the editing unit 202 acquires the page number of the editing-target page.

At step S1905, the editing unit 202 acquires editing information. Here, the editing information includes information indicating whether the contents of editing are deletion of a page or addition of a page, and information relating to a change of a character string to be displayed (hereinafter, displayed character string). The information relating to the change of a displayed character string includes information indicating whether a displayed character string is added or deleted by editing and the displayed character string itself that is changed.

At step S1906, the editing unit 202 determines whether the contents of editing are deletion of a page based on the editing information acquired at step S1905. In the case where the results of the determination at step S1906 are affirmative, the processing advances to step S1907. On the other hand, in the case where the results of the determination are negative, the processing advances to step S1908.

In the following, the case is explained where the contents of editing are deletion of a page (the case of YES at step S1906). At step S1907, the editing unit 202 deletes all the text object information 920 having the same page number as the page number of the editing-target page (deleted page) acquired at step S1904 as Position information 912 from the document search information 510. Next, the processing advances to step S1916.

At step S1916, the editing unit 202 updates the text object information 920 relating to the text object existing on a page after the editing-target page, specifically, updates Position information 912. For example, in the case where the page number is 3, which is Position information 912 of the text object information 920 relating to a certain text object, and the second page is deleted by editing, the page number is updated from 3 to 2.

Next, the case is explained where the contents of editing are not deletion of a page (the case of NO at step S1906). At step S1908, the editing unit 202 determines whether the contents of editing are addition of a page based on the editing information acquired at step S1905. In the case where the results of the determination at step S1908 are affirmative, the processing advances to step S1913. On the other hand, in the case where the results of the determination are negative, the processing advances to step S1909.

In the following, the case is explained where the contents of editing are addition of a page (the case of YES at step S1908). At step S1913, the editing unit 202 acquires text object information on the text object that exists on the page added by editing.

At step S1914, the editing unit 202 updates the document search information 510 by using the text object information acquired at step S1913. Specifically, the editing unit 202 adds the text object information 920 (Character string 911 and the like) corresponding to each text object that exists on the page added by editing to the document search information 510.

At step S1915, the editing unit 202 updates the text object information 920 relating to the text object that exists on a page after the editing-target page, specifically, updates Position information 912. For example, in the case where the page number is 3, which is Position information 912 of the text object information 920 relating to a certain text object, and the second page is added by editing, the page number is updated from 3 to 4.

Next, the case is explained where the contents of editing are not addition of a page (the case of NO at step S1908). At step S1909, the editing unit 202 determines whether a displayed character string is added based on the editing information acquired at step S1905. In the case where the results of the determination at step S1909 are affirmative, the processing advances to step S1912. On the other hand, in the case where the results of the determination are negative, the processing advances to step S1910.

At step S1912, the editing unit 202 adds the text object information 920 having the displayed character string that is added as Character string 911 to the document search information 510.

At step S1910, the editing unit 202 determines whether the displayed character string is deleted based on the editing information acquired at step S1905. In the case where the results of the determination at step S1910 are affirmative, the processing advances to step S1911. On the other hand, in the case where the results of the determination are negative, the series of processing is terminated.

At step S1911, the editing unit 202 deletes the text object information 920 having the displayed character string that is deleted as Character string 911 from the document search information 510.

By the present embodiment, it is made possible to update the document search information 510 in accordance with the editing contents of a document and in the case where the imaged document data, which is created by the imaging processing for document data, is edited, it is made possible to make a search using a displayed character string also for the edited imaged document data. In the above-described explanation, the case is explained where the present embodiment is applied to the first embodiment, but it is also possible to apply the present embodiment to the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present invention, it is made possible to exclude a character string that is not displayed in a state where a user can visually recognize it from the targets that can be searched for at the time of creating imaged document data by performing imaging processing for document data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-169353, filed Aug. 31, 2016, which is hereby incorporated by reference wherein in its entirety.

What is claimed is:

1. An apparatus comprising:
a memory; and
at least one processor that performs:
creating imaged document data, whose entire page is made up of one image object, based on document data including text objects and image objects within a page;
determining whether each of the text objects is a text object to be embedded into the imaged document data; and
embedding, into the imaged document data, data of a character string corresponding to the text object that is determined to be embedded into the imaged document data,
wherein the determining comprises, for each of the text objects:
determining whether the text object is transparent;
performing, in a case where there is an image object that overlaps on an area of the text object determined to be transparent, OCR processing for the image object to obtain a character string corresponding to the image object;
determining that, in a case where character string of the text object determined to be transparent is the same as the obtained character string corresponding to the image object, the transparent text object is a text object to be embedded into the imaged document data; and
determining that, in a case where the character string of the text object determined to be transparent is not the same as the obtained character string corresponding to the image object, the transparent text object is a text object not to be embedded into the imaged document data.

2. The apparatus according to claim 1, wherein
the embedding comprises:
duplicating the text object that is determined to be embedded into the imaged document data;
embedding the data of the character string corresponding to the duplicated text object in the imaged document data in an undisplayed state.

3. The apparatus according to claim 1, wherein
the determining further comprises:
determining whether there exists a higher object that is located within an existence area of the text object and which is arranged higher so as to overlap the text object; and
determining whether, in a case where the higher object exists, the higher object is transparent.

4. The apparatus according to claim 3, wherein
the determining further comprises:
determining whether, in a case where the higher object does not exist or in a case where the higher object is transparent, a background color of the text object and a color of a character of the text object are the same; and
determining that, in a case where the background color of the text object and the color of the character of the text object are the same, the text object is a text object not to be embedded into the imaged document data.

5. The apparatus according to claim 3, further comprising:
in a case where the higher object is not transparent, deriving overlapped character that is not displayed because the text object and the higher object overlap.

6. The apparatus according to claim 3, further comprising:
generating a non-overlapped character string that is displayed because the text object and the higher object do not overlap, and information on coordinates of the non-overlapped character string.

7. The apparatus according to claim 1, further comprising:
creating search information that is associated with the imaged document data and which includes information corresponding to the text object that is determined to be embedded into the imaged document data.

8. The apparatus according to claim 7, wherein
the search information further includes:
information indicating whether a search using a character string is possible for imaged document data;
information indicating whether a manuscript object of a text object is embedded in imaged document data; and
information indicating whether an annotation object of a text object is embedded in imaged document data.

9. The apparatus according to claim 7, wherein
in a case where the imaged document data is updated, the search information associated with the imaged document is also updated.

10. A method comprising:
creating imaged document data, whose entire page is made up of one image object, based on document data including text objects and image objects within a page;
determining whether each of the text objects is a text object to be embedded into the imaged document data; and
embedding, into the imaged document data, data of a character string corresponding to the text object that is determined to be embedded into the imaged document data,
wherein the determining comprises, for each of the text objects:
determining whether the text object is transparent;
performing, in a case where there is an image object that overlaps on an area of the text object determined to be transparent, OCR processing for the image object to obtain a character string corresponding to the image object;
determining that, in a case where character string of the text object determined to be transparent is the same as the obtained character string corresponding to the image object, the transparent text object is a text object to be embedded into the imaged document data; and
determining that, in a case where the character string of the text object determined to be transparent is not the same as the obtained character string corresponding to the image object, the transparent text object is a text object not to be embedded into the imaged document data.

11. A non-transitory computer readable storage medium storing a program for causing a computer to perform:
creating imaged document data, whose entire page is made up of one image object, based on document data including text objects and image objects within a page;
determining whether each of the text objects is a text object to be embedded into the imaged document data; and
embedding, into the imaged document data, data of a character string corresponding to the text object that is determined to be embedded into the imaged document data, wherein the determining comprises, for each of the text objects:

determining whether the text object is transparent;

performing, in a case where there is an image object that overlaps on an area of the text object determined to be transparent, OCR processing for the image object to obtain character string corresponding to the image object;

determining that, in a case where character string of the text object determined to be transparent is the same as the obtained character string corresponding to the image object, the transparent text object is a text object to be embedded into the imaged document data; and determining that, in a case where the character string of the text object determined to be transparent is not the same as the obtained character string corresponding to the image object, the transparent text object is a text object not to be embedded into the imaged document data.

* * * * *